United States Patent
Choi et al.

(10) Patent No.: US 10,721,288 B2
(45) Date of Patent: Jul. 21, 2020

(54) METHOD FOR SHARING FILE AND ELECTRONIC DEVICE FOR THE SAME

(71) Applicant: SAMSUNG ELECTRONICS CO., LTD, Suwon-si, Gyeonggi-do (KR)

(72) Inventors: Yunsung Choi, Seoul (KR); Bowon Kim, Suwon-si (KR); Katherine Cheong, Seoul (KR); Eun Sun Chae, Seoul (KR); Byung-Min Jung, Seongnam-si (KR); Yong Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/741,863

(22) Filed: Jan. 14, 2020

(65) Prior Publication Data

US 2020/0153887 A1   May 14, 2020

Related U.S. Application Data

(63) Continuation of application No. 15/609,302, filed on May 31, 2017, now abandoned.

(51) Int. Cl.
| | |
|---|---|
| *H04L 29/08* | (2006.01) |
| *H04L 12/06* | (2006.01) |
| *G06F 21/62* | (2013.01) |
| *G06F 21/60* | (2013.01) |
| *H04W 12/06* | (2009.01) |

(52) U.S. Cl.
CPC ............ *H04L 67/06* (2013.01); *G06F 21/606* (2013.01); *G06F 21/6218* (2013.01); *H04W 12/06* (2013.01)

(58) Field of Classification Search
CPC ... H04L 67/06; G06F 21/606; G06F 21/6218; G06F 16/172; H04W 12/06
See application file for complete search history.

(56) References Cited

U.S. PATENT DOCUMENTS

| | | | |
|---|---|---|---|
| 8,260,883 B2 | 9/2012 | Mooring | |
| 8,964,947 B1 | 2/2015 | Noolu | |
| 9,854,063 B2* | 12/2017 | Borzycki | ............ G06F 21/6218 |
| 9,935,999 B1* | 4/2018 | Hudgin | ................... H04L 67/06 |

(Continued)

FOREIGN PATENT DOCUMENTS

| | | |
|---|---|---|
| KR | 10-2014-0036887 | 3/2014 |
| KR | 10-2016-0017804 | 2/2016 |

OTHER PUBLICATIONS

U.S. Appl. No. 15/609,302, filed May 31, 2017; Choi et al.

*Primary Examiner* — Todd L Barker
(74) *Attorney, Agent, or Firm* — Nixon & Vanderhye P.C.

(57) ABSTRACT

A method and an apparatus include a memory, a communication unit comprising communication circuitry, and a processor functionally coupled with the memory and/or the communication unit. The processor is configured to receive a transmit request of a file stored in the memory, to determine whether the requested file exceeds a reference size, to send the requested file to a server through the communication unit using a module configured with a file transfer function if the requested file exceeds the reference size, to receiver from the server a file access path relating to the transmitted file, and to share the received file access path with another electronic device.

6 Claims, 21 Drawing Sheets

(56) References Cited

U.S. PATENT DOCUMENTS

| | | | |
|---|---|---|---|
| 2004/0098383 A1* | 5/2004 | Tabellion | G06F 16/11 |
| 2006/0026213 A1* | 2/2006 | Yaskin | G09B 7/02 |
| 2007/0016680 A1 | 1/2007 | Burd | |
| 2008/0154990 A1 | 6/2008 | Jankowsky | |
| 2008/0162707 A1* | 7/2008 | Beck | G06F 21/6218 |
| | | | 709/229 |
| 2008/0313290 A1 | 12/2008 | Park | |
| 2013/0014169 A1 | 1/2013 | Sansom | |
| 2013/0117365 A1* | 5/2013 | Padmanabhan | H04L 67/10 |
| | | | 709/204 |
| 2013/0159429 A1* | 6/2013 | Nalliah | H04L 51/22 |
| | | | 709/206 |
| 2013/0218986 A1* | 8/2013 | Sobhani | H04L 51/22 |
| | | | 709/206 |
| 2013/0227082 A1* | 8/2013 | Lin | H04L 67/06 |
| | | | 709/219 |
| 2014/0033012 A1* | 1/2014 | Dhillon | G06F 40/174 |
| | | | 715/229 |
| 2014/0337734 A1* | 11/2014 | Bradford | G06Q 10/00 |
| | | | 715/719 |
| 2015/0067715 A1* | 3/2015 | Koat | H04H 60/15 |
| | | | 725/25 |
| 2015/0113441 A1* | 4/2015 | Felt | G06T 11/60 |
| | | | 715/753 |
| 2015/0193465 A1* | 7/2015 | Schoeffler | G06F 3/04842 |
| | | | 707/827 |
| 2015/0350134 A1 | 12/2015 | Yang et al. | |
| 2016/0173491 A1* | 6/2016 | Moten | H04L 63/0846 |
| | | | 726/4 |
| 2017/0099149 A1* | 4/2017 | Eber | H04L 67/06 |
| 2017/0262157 A1* | 9/2017 | Shem Tov | G06F 3/04817 |
| 2018/0124684 A1 | 5/2018 | Kwon | |

* cited by examiner

METHOD FOR SHARING FILE AND ELECTRONIC DEVICE FOR THE SAME

CROSS-REFERENCE TO RELATED APPLICATION

This application is a Continuation of U.S. application Ser. No. 15/609,302, filed May 31, 2017 (now abandoned), which claims priority to KR 10-2016-0069593, filed Jun. 3, 2016, the entire contents of which are all hereby incorporated herein by reference in their entireties.

TECHNICAL FIELD

The present disclosure relates generally to a method for sharing a file and an electronic device for the same.

BACKGROUND

With advances in mobile communication technology, an electronic device can conduct a voice call function and various data communication functions. The electronic device, for example, a mobile device or a user equipment can provide various services through various applications. The electronic device can provide a multimedia service, for example, a music service, a video service, or a digital broadcasting service, or a network-based communication service such as a call, wireless Internet, Short Message Service (SMS), and a Multimedia Messaging Service (MMS).

The electronic device can send a file to another electronic device over a network or upload an intended file to a web server (e.g., a cloud server). However, when a size (e.g., volume, number) of the file to transmit is considerable (e.g., a large file), the electronic device can send the file after adjusting (e.g., trimming, resizing) the size or a resolution of the original file, or fail in the file transfer due to the file size. That is, when the electronic device transfers the large file, the file transfer is subject to a problem.

SUMMARY

According to various example embodiments of the present disclosure, an electronic device can include a memory, a communication unit comprising communication circuitry, and a processor functionally coupled with the memory and/or the communication unit, wherein the processor is configured to receive a transmit request of a file stored in the memory, to determine whether the requested file exceeds a reference size, to send the requested file to a server through the communication unit using a module configured with a file transfer function if the requested file exceeds the reference size, to receive from the server a file access path relating to the transmitted file, and to share the received file access path with another electronic device.

According to various example embodiments of the present disclosure, a method for operating an electronic device can include receiving a transmit request of a file stored in a memory of the electronic device, determining whether the requested file exceeds a reference size, if the requested file exceeds the reference size, sending the requested file to a server using a module configured with a file transfer function, receiving a file access path relating to the transmitted file from the server, and sharing the received file access path with another electronic device.

According to various example embodiments, the file can be uploaded to the server without adjusting a size or a resolution of a file to send to another electronic device.

According to various example embodiments, by sharing the file access path regarding the storage location of the file uploaded to the server with another user, the other user can easily download the file via the file access path.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components and structures.

DETAILED DESCRIPTION

Figure 1:
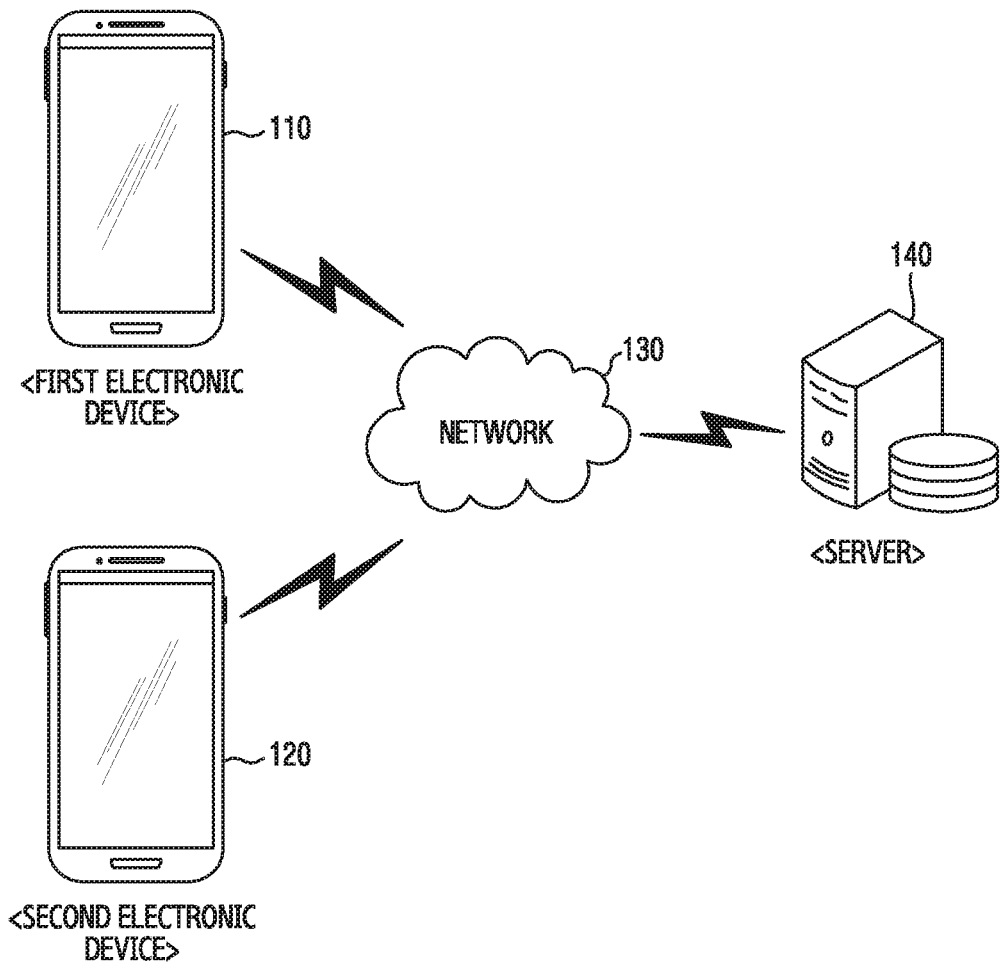
FIG. 1 is a diagram illustrating an example network environment of an electronic device and a server according to various example embodiments.

Hereinafter, various example embodiments of the present disclosure are described with reference to the accompanying drawings. However, it should be understood that there is no intent to limit the present disclosure to the particular forms disclosed herein; rather, the present disclosure should be understood to cover various modifications, equivalents, and/or alternatives of the embodiments of the present disclosure. In the description below of the accompanying drawings, similar reference numerals can be used to designate similar elements. The various embodiments included in this disclosure are presented for the explanation and the understanding of the technical contents, not to limit the scope of the disclosure. Accordingly, the scope of the present disclosure should be construed to include all the changes or other various embodiments based on technical ideas of the present disclosure.

An electronic device according to an embodiment of the present disclosure can include any device using one or more of various processors (e.g., processing circuitry), such as, for example, and without limitation, a dedicate processor, an Application Processor (AP), a Communication Processor (CP), a Graphics Processing Unit (GPU), and a Central Processing Unit (CPU), such as any information communication device, multimedia device, wearable device, and their application devices, supporting a function (e.g., a communication function, a displaying function) according to various embodiments of the present disclosure.

An electronic device according to an embodiment of the present disclosure can include at least one of, for example, a smartphone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a Moving Picture Experts Group Audio Layer 3 (MP3) player, a mobile medical appliance, a camera, and a wearable device (e.g., smart glasses, a Head-Mounted-Device (HMD), or a smart watch), or the like, but is not limited thereto.

An electronic device according to an embodiment of the present disclosure can be a smart home appliance. The smart home appliance can include at least one of, for example, a television, a Digital Video Disk (DVD) player, a refrigerator, an air conditioner, a vacuum cleaner, a washing machine, a set-top box, a home automation control panel, a Television (TV) box (e.g., Samsung HomeSync™, Apple TV™, or Google TV™), a game console (e.g., Xbox™, Play Station™), and an electronic frame, or the like, but is not limited thereto. Also, the electronic device according to an embodiment of the present disclosure can include at least one of a navigation device and Internet of Things (IoT) device, or the like, but is not limited thereto.

In various embodiments, an electronic device can combine one or more of those various devices. The electronic device can be a flexible device. The electronic device is not limited to the foregoing devices and can include a newly developed electronic device.

The term "user" can refer to a person using an electronic device or a device using an electronic device (e.g., an artificial intelligence electronic device). In an embodiment of the present disclosure, a module or a program module can further include at least one or more of the aforementioned components, or omit some of them, or further include additional other components. Operations performed by a module, a program module, or other components according to various embodiments of the present disclosure can be executed in a sequential, parallel, repetitive, or heuristic manner. In addition, some of the operations can be executed in a different order or be omitted, or other operations can be added.

Now, a method and an apparatus for sharing a file are described according to various example embodiments of the present disclosure. However, the various example embodiments of the present disclosure are not restricted by or limited to contents which will be described below and therefore, and it should be noted that they may be applied to various embodiments based on the embodiments which will be described below. In embodiments of the present disclosure described below, a hardware approach will be described as an example. However, since the embodiments of the present disclosure include a technology using both hardware and software, the present disclosure does not exclude a software-based approach.

FIG. 1 is a diagram illustrating an example network environment of an electronic device and a server according to various example embodiments.

Referring to FIG. 1, a first electronic device 110 can communicate with a second electronic device 120 and/or a server 140 (e.g., a web server, a cloud server) over a network 130. The first electronic device 110 can send (or transmit) a file to the second electronic device 120 or upload a file to the server 140 over the network 130. In the following, the first electronic device 110 can serve as "an originating electronic device" which sends a file, and the second electronic device 120 can serve as "a receiving electronic device" which receives the file.

The first electronic device 110 can receive a file selected by a user (e.g., a first user of the first electronic device 110), and receive a request to send the selected file to the second electronic device 120. The first electronic device 110 can determine whether a size (e.g., volume, number) of the requested file exceeds a reference size. The reference size can be preset (or pre-determined) in the first electronic device 110, or be set by the user. The reference size can be received from a server such as a base station and set in the first electronic device 110. That is, the reference size can differ per base station. Accordingly, if the base station changes, the first electronic device 110 can receive the reference size from the changed base station and reset the reference size. If the size of the requested file exceeds the reference size, the first electronic device 110 can provide a first user interface. The first user interface can comprise an application list including an application for large file transfer (e.g., a module configured with a file transfer function) and one or more applications for normal file transfer (e.g., a module configured with a normal file transfer function). Hereafter, the application can be a software module configured with the file transmit function or a program performed a function (e.g., the file transmit function). The first user interface can include counterpart information (e.g., name, contact, application) for the file transfer.

If the size of the requested file does not exceed the reference size, the first electronic device 110 can provide a second user interface. The second user interface can comprise an application list including one or more applications for the normal file transfer. That is, if the size of the requested file does not exceed the reference size, the first electronic device 110 may not provide the large file transfer application. Even if the size of the requested file does not exceed the reference size, the first electronic device 110 can provide the first user interface according to various embodiments.

The first electronic device 110 can select one application from the first user interface or the second user interface. When the size of the requested file exceeds the reference size and the selected application is the large file transfer application, the first electronic device 110 can send the requested file to the server 140 through the large file transfer application.

According to various embodiments, when the size of the requested file exceeds the reference size and the selected application is the normal file transfer application, the first electronic device 110 can display a guidance message for the large file transfer. The guidance message can comprise contents that the requested file can be transmitted using the normal file transfer application by reducing (or resizing) the size of the requested file or by lowering a resolution of the requested file due to the large size, or the original of the requested file can be transmitted using the large file transfer application. The guidance message can be provided in the form of a popup window. According to a user selection in the guidance message, the first electronic device 110 can send the requested file to the second electronic device 120 through the normal file transfer application, or to the server 140 through the large file transfer application. When the size of the requested file does not exceed the reference size and the selected application is the normal file transfer application, the first electronic device 110 can send the requested file to the second electronic device 120 through the normal file transfer application.

According to various embodiments, when the file is destined for one or more counterparts (e.g., the second electronic device 120), the first electronic device 110 can recommend the large file transfer application. For example, when the file is destined for one counterpart regardless of the file size, the first electronic device 110 can provide the first user interface. Alternatively, when the file size exceeds the reference size and the file is destined for one or more counterparts, the first electronic device 110 can provide the first user interface. While the single second electronic device 120 is illustrated in FIG. 1, one or more second electronic devices 120 can be provided.

According to various embodiments, when sending the file to the server 140 through the large file transfer application, the first electronic device 110 can set sharing information (e.g., file sharing information) including the counterpart (e.g., a second user of the second electronic device 120) who shares the file and a file sharing period (e.g., file download expiration time). The first electronic device 110 can send the file sharing information with the file to the server 140.

The server 140 can receive the file from the first electronic device 110 and store the received file in a database (not shown). The server 140 can generate a file access path based on a storage location of the received file. For example, the server 140 can generate the file access path based on at least one of information (e.g., phone number) of the first electronic device 110 which sends the file, a type of the received file (e.g., text, image, video), and the file storage location.

For example, the file access path can be address information (e.g., Uniform Resource Locator (URL)) including an address (e.g., URL) of the server 140 and an authentication code (e.g., Personal Identification Number (PIN) code) indicating the file storage location in the database of the server 140. The server 140 can send the generated file access path to the first electronic device 110.

According to various embodiments, the server 140 can generate a thumbnail based on the file type. For example, when the file type is an image or a video, the server 140 can generate a thumbnail related to the file. The server 140 can send the generated file access path and the thumbnail related to the file to the first electronic device 110. The first electronic device 110 can share the generated file access path with the second electronic device 120. Alternatively, the first electronic device 110 can share the generated file access path and the file thumbnail with the second electronic device 120. For example, when an application is executed in the file transfer to the server 140, the first electronic device 110 can automatically input (or copy) the file access path into an input field (e.g., an input window, an input region) of the executed application. When the user selects a 'send button', the file access path entered in the input field can be sent to the second electronic device 120 through the executed application. Alternatively, when no application is executed in the file transfer to the server 140, the first electronic device 110 can select an application for sending the file access path and select a counterpart (e.g., the second user of the second electronic device 120) for sending the file access path in the selected application. The first electronic device 110 can automatically enter the file access path in the input field of the selected application. For example, when the user selects the 'send button', the file access path entered in the input field can be transmitted to the second electronic device 120 through the selected application.

Based on the file access path, the second electronic device 120 can invoke a webpage including the file uploaded by the first electronic device 110. As the user (e.g., the second user of the second electronic device 120) selects the file access path, the second electronic device 120 can display the webpage including the file uploaded by the first electronic device 110 in the server 140. The second user can select a file to be downloaded from files included the webpage and then request to download the selected file. The second electronic device 120 can receive the requested file from the server 140 and store the received file in a memory.

According to various embodiments, the second electronic device 120 can access the server 140 with the address of the server 140. When the second electronic device 120 accesses the server 140, the server 140 can provide a main page to the second electronic device 120. For example, the main page of the server 140 can include an input field for entering an authentication code regarding the file access path. The second electronic device 120 can provide a keyboard when a cursor is placed in the input field under user's control, and receive the authentication code from the user through the keyboard. The authentication code can indicate the storage location of the file uploaded by the first electronic device 110 in the server 140. The server 140 can provide the second electronic device 120 with the webpage including the file uploaded by the first electronic device 110 based on the authentication code which is input from the second electronic device 120. The second electronic device 120 can receive a file to download selected by the user in the webpage and request the downloading. The second electronic device 120 can receive the requested file from the server 140 and store the received file in the memory.

Figure 2:
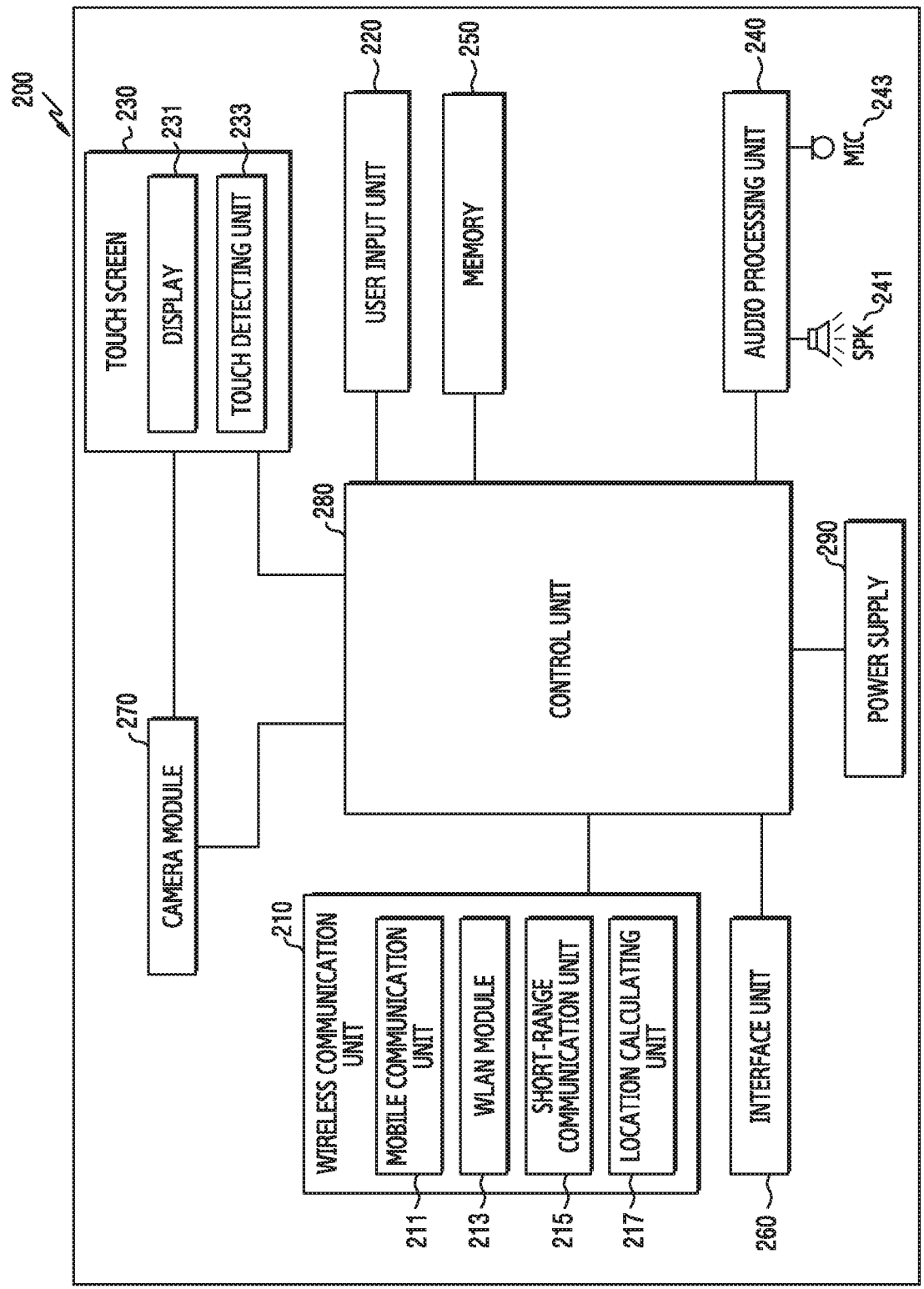
FIG. 2 is a block diagram illustrating an example electronic device according to various example embodiments.

FIG. 2 is a block diagram illustrating an example electronic device according to various example embodiments.

Referring to FIG. 2, the electronic device 200 can include a wireless communication unit (e.g., including communication circuitry) 210, a user input unit (e.g., including input circuitry) 220, a touch screen 230, an audio processing unit (e.g., including audio output circuitry) 240, a memory 250, an interface unit (e.g., including interface circuitry) 260, a camera module (e.g., including a camera) 270, a control unit (e.g., a controller or processor including processing circuitry) 280, and a power supply 290. The components of FIG. 2 are not essential in the electronic device 200 in various embodiments of the present disclosure, and the electronic device 200 can include more or less components than those in FIG. 2.

The wireless communication unit 210 may include various communication circuitry, such as, for example, and without limitation, one or more modules enabling wireless communication between the electronic device 200 and other external electronic device. In various embodiments, the wireless communication unit 210 can include a module including various communication circuitry (e.g., a short-range communication module, a long-range communication module) for communicating with the external electronic device in vicinity. For example, the wireless communication unit 210 can include various communication circuitry, such as, without limitation, a mobile communication module 211, a Wireless Local Area Network (WLAN) module 213, a short-range communication module 215, and a location calculating module 217.

The mobile communication module 211 can send and receive radio signals to and from at least one of a base station, the external electronic device, and various servers (e.g., an integration server, a provider server, a content server, an Internet server, or a cloud server) over a mobile communication network. The radio signals can include a voice signal, a data signal, or various control signals. The mobile communication module 211 can send various data required for operations of the electronic device 200 to an external device (e.g., a server or another electronic device) in response to a user request. In various embodiments, the mobile communication module 211 can send and receive radio signals based on various communication schemes. For example, the communication scheme (or method) can include, but not limited to, Long Term Evolution (LTE), LTE Advanced (LTE-A), Global System for Mobile communication (GSM), Enhanced Data GSM Environment (EDGE), Code Division Multiple Access (CDMA), Wideband CDMA (WCDMA), Universal Mobile Telecommunications System (UMTS), or Orthogonal Frequency Division Multiple access (OFDMA).

The WLAN module 213 may refer, for example, to a module for establishing wireless Internet access and a WLAN link with the other external electronic device. The WLAN module 213 can be embedded in or mounted outside the electronic device 200. The wireless Internet technique can employ Wireless Fidelity (WiFi), Wireless broadband (Wibro), World interoperability for Microwave Access (Wi-Max), High Speed Downlink Packet Access (HSDPA), or millimeter Wave (mmWave). In association with the other external electronic device connected with the electronic device 200 over a network (e.g., wireless Internet network), the WLAN module 213 can send or receive various data of the electronic device 200 to or from the outside (e.g., the external electronic device or the server). The WLAN module 213 can keep turning on, or be turned on according to setting of the electronic device 200 or a user input.

The short-range communication module 215 may refer, for example, to a module for conducting short-range communication. The short-range communication can employ Bluetooth, Bluetooth Low Energy (BLE), Radio Frequency Identification (RFID), Infrared Data Association (IrDA), Ultra Wideband (UWB), Zigbee, or Near Field Communication (NFC). In association with the other external electronic device (e.g., an external sound device) connected with the electronic device 200 over a network (e.g., a short-range communication network), the short-range communication module 215 can send or receive various data of the electronic device 200 to or from the outside. The short-range communication module 215 can keep turning on, or be turned on according to the setting of the electronic device 200 or a user input.

The location calculating module 217 may refer, for example, to a module for obtaining a location of the electronic device 200. For example, the location calculating module 217 can include a Global Positioning System (GPS) module. The location calculating module 217 can measure the location of the electronic device 200 using triangulation. For example, the location calculating module 217 can calculate distance information and time information from three or more base stations, apply the triangulation to the calculated information, and thus calculate current three-dimensional location information based on latitude, longitude, and altitude. Alternatively, the location calculating module 217 can calculate the location information by continuously receiving location information of the electronic device 200 from three or more satellites in real time. The location information of the electronic device 200 can be acquired in various manners.

The user input unit 220 may include various input circuitry and can generate input data for controlling the operation of the electronic device 200 in response to a user input. The user input unit 220 can include various input circuitry for detecting user's various inputs. For example, the user input unit 220 can include various input circuitry, such as, for example, and without limitation, a key pad, a dome switch, a physical button, a (resistive/capacitive) touch pad, a jog and shuttle, and a sensor. Part of the user input unit 220 can be implemented as a button outside the electronic device 200, and part or whole of the user input unit 220 may be implemented as a touch panel. The user input unit 220 can receive a user input for initiating the operation of the electronic device 200 according to various embodiments of the present disclosure, and generate an input signal according to the user input.

The touch screen 230 indicates an input/output device for executing an input function and a displaying function at the same time, and can include a display 231 and a touch detecting unit 233. The touch screen 230 can provide an input/output interface between the electronic device 200 and the user, forward a user's touch input to the electronic device 200, and serve an intermediary role for showing an output from the electronic device 200 to the user. The touch screen 230 can display a visual output to the user. The visual output can include text, graphics, video, and their combination. The touch screen 230 can display various screens according to the operation of the electronic device 200 through the display 231. As displaying a particular screen through the display 231, the touch screen 230 can detect an event (e.g., a touch event, a proximity event, a hovering event, an air gesture event) based on at least one of touch, hovering, and air gesture from the user through the touch detecting unit 233, and send an input signal according to the event to the control unit 280.

According to various embodiments of the present disclosure, the display 231 can display (output) various information processed in the electronic device 200. For example, the display 231 can display a user interface (or a graphical user interface) which includes an application list including a large file transfer application or one or more normal file transfer applications, or counterpart information (e.g., name, contact, application) for the file transfer. According to various embodiments, the display 231 can display a user interface including a guidance message for the large file transfer. The display 231 can display a main page of the server 140 or a webpage including a file uploaded to the server 140. The display 1231 can display a file list including files uploaded or downloaded.

The display 231 can support a screen display in a landscape mode, a screen display in a portrait mode, or a screen display according to transition between the landscape mode and the portrait mode, based on a rotation direction (or an orientation) of the electronic device 200. The display 231 can employ various displays. The display 231 can employ a bended display. For example, the display 231 can include the bended display which can be bent or rolled without damage by use of a thin and flexible substrate like paper.

The bended display can be coupled to a housing (e.g., a main body) and maintain a bent shape. The electronic device 200 may be realized using a display device which can be freely bent and unrolled like a flexible display as well as the bended display. The display 231 can exhibit foldable and unfoldable flexibility by substituting a glass substrate covering a liquid crystal with a plastic film in a Liquid Crystal Display (LCD), a Light Emitting Diode (LED) display, an Organic LED (OLED) display, an Active Matrix OLED (AMOLED) display, or an electronic paper. The display 231 can be extended and coupled to at least one side (e.g., at least one of a left side, a right side, an upper side, and a lower side) of the electronic device 200.

The touch detecting unit 233 may include various touch detecting circuitry and can be disposed in the display 231, and detect a user input for contacting or approaching a surface of the touch screen 230. The touch detecting unit 233 can receive the user input for initiating the operation related with use the electronic device 200 and issue an input signal according to the user input. The user input includes a touch event or a proximity event input based on at least one of a single-touch, a multi-touch, a hovering, and an air gesture input. For example, the user input can be input using tap, drag, sweep, swipe, flick, drag and drop, or a drawing gesture (e.g., writing, handwriting).

The audio processing unit 240 may include various audio processing circuitry and can send to a speaker (SPK) 241 an audio signal input from the control unit 280, and forward an audio signal such as a voice input from a microphone (MIC) 243 to the control unit 280. The audio processing unit 240 can include circuitry to convert and output voice/sound data into an audible sound through the speaker 241 under control of the control unit 280, and convert an audio signal such as a voice received from the microphone 243 into a digital signal to forward the digital signal to the control unit 280. The audio processing unit 240 can output an audio signal responding to a user input according to audio processing information (e.g., an effect sound, a music file, etc.) inserted into data.

The speaker 241 can output audio data received from the wireless communication unit 210 or stored in the storage unit 250. The speaker 241 may output sound signals relating to various operations (functions) in the electronic device 200. Although not depicted, the speaker 241 can include an attachable and detachable earphone, headphone, or headset, connected to the electronic device 200 through an external port.

The microphone 243 can receive and process an external sound signal into electric voice data. Various noise reduction algorithms can be applied to the microphone 243 in order to eliminate noises generated in the received external sound signal. The microphone 243 can receive an audio stream such as a voice command (e.g., a voice command for initiating the file transfer application). The microphone 243 can include an internal microphone built in the electronic device 200 and an external microphone connected to the electronic device 200.

The memory 250 can store one or more programs executed by the control unit 280, and may temporarily store input/output data. The input/output data can include, for example, video, image, photo, and audio files. The memory 250 can store the obtained data, store the data obtained in real time in a temporary storage device, and store data to store in a storage device allowing for long-term storage.

The memory 250 can store instructions for receiving a transmit request of the stored file, determining whether the requested file exceeds the reference size, sending the requested file to the server 140 through the wireless communication unit 210 using the module (e.g., application) configured with the file transfer function if the requested file exceeds the reference size, receiving the file access path regarding the transmitted file from the server 140, and sharing the received file access path with another electronic device. In various embodiments, the memory 250 can store instructions for, when executed, causing the control unit 280 (e.g., one or more processors) to receive a transmit request of the stored file, to determine whether the requested file exceeds the reference size, to send the requested file to the server 140 through the wireless communication unit 210 using the module of the file transfer function when the requested file exceeds the reference size, to receive the file access path regarding the transmitted file from the server 140, and to share the received file access path with another electronic device.

The memory 250 can continuously or temporarily store an Operating System (OS) of the electronic device 200, a program relating to the input and the display control using the touch screen 230, a program relating to controlling various operations (functions) of the electronic device 200, and various data generated by operations of each program.

The memory 250 can include an extended memory (e.g., an external memory) or an internal memory. The memory 250 can include at least one memory of a flash memory type, a hard disk type, a micro type, a card type memory (e.g., a Secure Digital (SD) card or an eXtreme Digital (XD) card). The memory 250 can include at least one storage medium of a Dynamic Random Access Memory (DRAM), a Static Random Access Memory (SRAM), a Read-Only Memory (ROM), a Programmable ROM (PROM), an Electrically Erasable Programmable ROM (EEPROM), a Magnetic RAM (MRAM), a magnetic disc, and an optical disc type memory. The electronic device 200 may operate in association with a web storage which performs as a storage function of the memory 250 on the Internet.

The memory 250 can store various software programs. For example, software components can include an OS software module, a communication software module, a graphic software module, a user interface software module, a Moving Picture Experts Group (MPEG) module, a camera software module, and one or more application software modules. The software component module can be represented as a set of commands and accordingly can be referred to as an instruction set. The module may be referred to as a program or application.

The OS software module can include various software components for controlling general system operations. Such general system operation control can include, for example, memory management and control, and power control and management. The OS software module can also process normal communication between various hardware (devices) and software components (modules).

The communication software module can enable communication with another electronic device, such as a computer, a server, or a portable terminal, through the wireless communication unit 210. Also the communication software module can be configured in a protocol structure corresponding to its communication method (or scheme). The graphic software module can include various software components for providing and displaying graphics on the touch screen 230. The term 'graphics' can encompass a text, a webpage, an icon, a digital image, a video, and an animation. The user interface software module can include various software components relating to the user interface. For example, the user interface software module is involved in a status change of the user interface and a condition for the user interface status change.

The MPEG module can include a software component enabling digital content (e.g., video, audio), processes and functions (e.g., content creation, reproduction, distribution, and transmission). The camera software module can include camera related software components allowing camera related processes and functions. The application module can include a web browser including a rendering engine, e-mail, instant message, word processing, keyboard emulation, address book, widget, Digital Right Management (DRM), iris scan, context cognition, voice recognition, and a location based service.

The interface unit 260 may include various interface circuitry and can receive data or power from another external electronic device and provide the data or the power to the components of the electronic device 200. The interface unit 260 can send data from the electronic device 200 to the other external electronic device. For example, the interface unit 260 can include various interface circuitry, such as, for example, and without limitation, a wired/wireless headphone port, an external charger port, a wired/wireless data port, a memory card port, an audio input/output port, a video input/output port, and an earphone port.

The camera module 270 may include a camera and associated circuitry and supports a camera function of the electronic device 200. The camera module 270 can capture an object under control of the control unit 280 and send the captured data (e.g., an image) to the display 231 and the control unit 280. The camera module 270 can include one or more image sensors. For example, the camera module 270 can include various circuitry, such as, for example, and without limitation, a front sensor (e.g., a front camera) disposed on a front side (e.g., on the same plane as the display 231) of the electronic device 200 and a rear sensor (e.g., a rear camera) disposed on a rear side (e.g., on a back side) of the electronic device 200.

The control unit 280 may include a controller, processor or the like including various processing circuitry and can control the operations of the electronic device 200. For example, the control unit 180 can perform various controls on music play, visualization of musical attributes, voice communication, data communication, and video communication. The control unit 280 can be implemented using one or more processors, or may be referred to as a processor. For example, the control unit 280 can include various processing circuitry, such as, for example, and without limitation, a dedicated processor, a CPU, a Communication Processor (CP), an Application Processor (AP), an interface (e.g., General Purpose Input/Output (GPIO)), or an internal memory, as separate components or can integrate them on one or more integrated circuits. The AP can conduct various functions for the electronic device 200 by executing various software programs, and the CP can process and control voice communications and data communications. The control unit 280 can execute a particular software module (an instruction set) stored in the memory 250 and thus carry out various functions corresponding to the module (the particular software module).

In various embodiments of the present disclosure, the control unit 280 can process to receive a transmit request of the file stored in the memory 250, to determine whether the requested file exceeds the reference size, to send the requested file to the server 140 through the wireless communication unit 210 using the module of the file transfer function if the requested file exceeds the reference size, to receive the file access path regarding the transmitted file from the server 140, and to share the received file access path with other electronic device. The controlling operation of the control unit 280 according to various embodiments of the present disclosure is now described with the drawings.

The control unit 280 according to an embodiment of the present disclosure can control the above-stated functions and various operations of typical functions of the electronic device 200. For example, the control unit 280 can control management of a particular application executed and a screen display. The control unit 280 cam receive an input signal corresponding to various touch event or proximity event inputs supported by a touch-based or proximity-based input interface (e.g., the touch screen 230), and control its function. Also, the control unit 280 may control various data transmissions/receptions based on the wired communication or the wireless communication.

The power supply 290 can receive external power or internal power and supply the power required to operate the components under control of the control unit 280. The power supply unit 290 can supply or cut the power to display 231 and the camera module 270 under the control of the control unit 280.

Various embodiments of the present disclosure can be implemented in a recording medium which can be read by a computer or a similar device using software, hardware or a combination thereof. According to hardware implementation, various embodiments of the present disclosure can be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for performing other functions.

In an embodiment, the recording medium can include a computer-readable recording medium which records a program for receiving the transmit request of the file stored in the memory 250, determining whether the requested file exceeds the reference size, sending the requested file to the server 140 through the wireless communication unit 210 using the module of the file transfer function if the requested file exceeds the reference size, receiving the file access path regarding the transmitted file from the server 140, and sharing the received file access path with other electronic device.

In some cases, various embodiments of the present disclosure can be implemented by the control unit 280. According to software implementation, the procedures and the functions in embodiments of the present disclosure may be implemented by separate software modules. The software modules can execute one or more functions and operations described in the disclosure.

Figure 3:
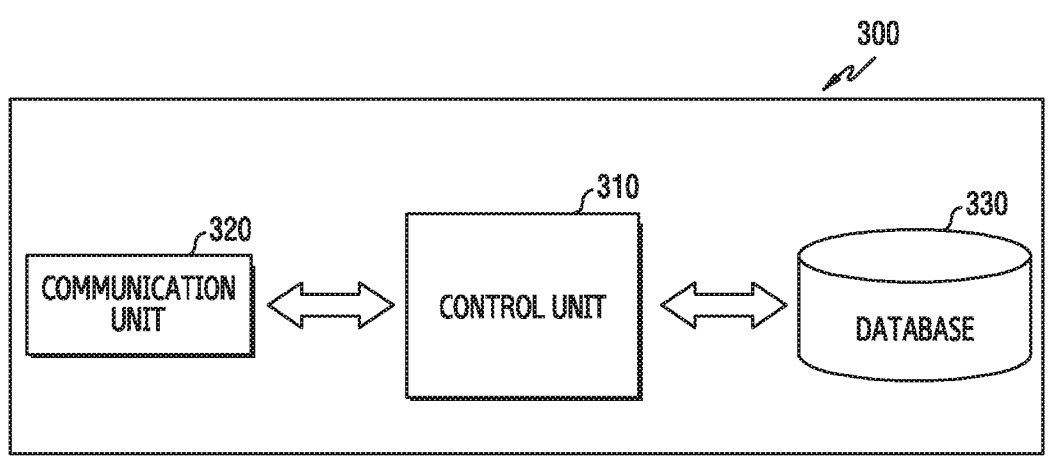
FIG. 3 is a block diagram illustrating an example server according to various example embodiments.

FIG. 3 is a block diagram illustrating an example server according to various example embodiments.

Referring to FIG. 3, the server 300 can include a control unit (e.g., a controller, processor, etc., including processing circuitry) 310, a communication unit (e.g., including communication circuitry) 320, and a database 330. The components of FIG. 3 are not essential in the server 300 in various embodiments of the present disclosure, and the server 300 can include more or less components than those in FIG. 3.

The communication unit 320 can include various communication circuitry including, for example, and without limitation, one or more modules for communicating with a first electronic device 110 or a second electronic device 120. The communication unit 320 can receive an upload request from the first electronic device 110 and receive a file from the first electronic device 110. The communication unit 320 can receive a download request from the second electronic device 120 and send a download-requested file to the second electronic device 120, or vice versa. For example, the communication unit 320 can receive a download request from the first electronic device 110 and send a download-requested file to the first electronic device 110. The communication unit 320 can receive an upload request from the second electronic device 120 and receive a file from the second electronic device 120.

The database 330 can store the file received from the first electronic device 110 or the second electronic device 120 under control of the control unit 310.

The control unit 310 may include, for example, a controller, a processor, or the like, and may include various processing circuitry that can generate a file access path based on a storage location of the received file. For example, the control unit 310 can generate the file access path based on at least one of information (e.g., phone number) of the first electronic device 110 sending the file, a type (e.g., text, image, video) of the received file, and the file storage location. For example, the file access path can be address information including an address (e.g., URL) of the server 300 and an authentication code indicating the file storage location in the database of the server 300. When the second electronic device 120 accesses the server 300, the control unit 310 can provide a main page to the second electronic device 120. The main page of the server 300 can include an input field for inputting the authentication code regarding the file access path. The control unit 310 can receive the authentication code from the second electronic device 120 through the communication unit 320, and provide the second electronic device 120 with a webpage including the file uploaded by the first electronic device 110 based on the received authentication code. The control unit 310 can control to send the file selected in the webpage provided with the file access path or the input authentication code to the second electronic device 120.

Figure 4:
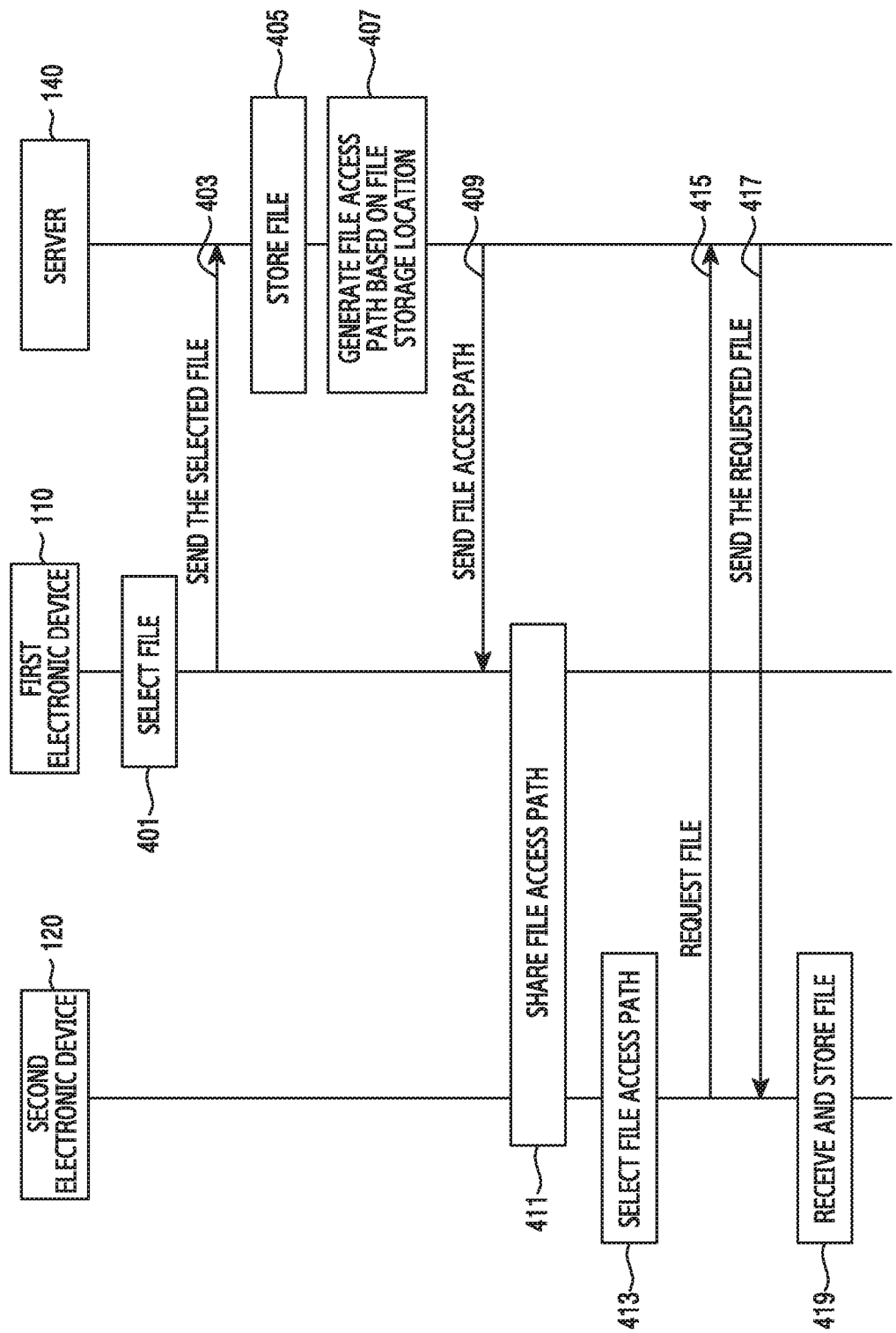
FIG. 4 is a flowchart illustrating an example file sharing method of an electronic device and a server according to various example embodiments.

FIG. 4 is a flowchart illustrating an example file sharing method of an electronic device and a server according to various example embodiments.

Referring to FIG. 4, in operation 401, a first electronic device 110 can select a file. For example, the first electronic device 110 can receive an intended file to send, selected by the user. The file indicates data stored in a memory (e.g., the memory 250) of the first electronic device 110, and can include, for example, multimedia contents such as text, image, or video. After selecting the file, the first electronic device 110 can receive a transmit request of the file selected by the user. In the transmit request, the first electronic device 110 can select an application or a counterpart to be sent the file, from the user. For example, when the transmit-requested file is transferable using a large file transfer application due to the large size, the first electronic device 110 can recommend the large file transfer application.

According to various embodiments, the first electronic device 110 can provide a user interface including at least one of the large file transfer application, one or more applications for normal file transfer, and counterpart information. When the file is destined for one or more counterparts (e.g., the second electronic device 120), the first electronic device 110 can provide the user interface including at least one of the large file transmit application, one or more applications for the normal file transfer, and the counterpart information. Now, operations when the user requests the file transfer through the large file transfer application are explained.

In operation 403, the first electronic device 110 can send the selected file to the server 140. The first electronic device 110 can send the original of the selected file to the server 140 without reducing (or resizing) a file size or lowering a resolution of the selected file. The first electronic device 110 can send the selected file to the server 140 through the wireless communication unit 210. When sending the file to the server 140, the first electronic device 110 can set setting information (e.g., sharing configuration information) for the file sharing. For example, the sharing configuration information can include at least one of a sharing period, a sharing counterpart, a sharing channel, and a sharing authentication code of the file. In operation 405, the server 140 (e.g., the server 300) can store the file received from the first electronic device 110. The server 140 can receive the file from the first electronic device 110 and store the file in a database 330.

In operation 407, the server 140 can generate a file access path based on the file storage location. The server 140 can generate the file access path based on at least one of the information (e.g., phone number) of the first electronic device 110 sending the file, the type (e.g., text, image, video) of the received file, and the file storage location. For example, the file access path can be address information including an address (e.g., URL) of the server 140 and an authentication code indicating the file location stored in the database 330 of the server 140.

When generating the file access path, the server 140 can create a thumbnail according to the file type. For example, when the file type is an image or a video, the server 140 can create the thumbnail associated with the file.

In operation 409, the server 140 can send the file access path to the first electronic device 110. Alternatively, the server 140 can send the generated file access path and the file thumbnail to the first electronic device 110.

In operation 411, the first electronic device 110 can share the file access path with the second electronic device 120. Alternatively, the first electronic device 110 can share the generated file access path and the file thumbnail with the second electronic device 120. While the first electronic device 110 is requested to send the selected file to the second electronic device 120, the selected file is large in size and accordingly can be uploaded to the server 140 instead of sending it to the second electronic device 120. That is, the first electronic device 110 can upload the original file to the server 140 without reducing the size or the resolution of the file, and then provide the second electronic device 120 with the file access path for downloading the file uploaded to the server 140. In this case, the second electronic device 120 can identify the file uploaded by the first electronic device 110 to the server 140 based on the file access path. After receiving the file access path, the first electronic device 110 can select the second electronic device 120 as the counterpart to provide the file access path. Alternatively, the first electronic device 110 can automatically provide the file access path to an application executed in the file transfer to the server 140. Alternatively, the first electronic device 110 can automatically provide the file access path and the thumbnail to the application executed in the file transfer to the server 140.

In operation 413, the second electronic device 120 can select the file access path. For example, the second electronic device 120 can receive (e.g., touch input) the file access path selected by the user (e.g., the second user of the second electronic device 120). Alternatively, when receiving the file access path and the thumbnail, the user can confirm the thumbnail and determine whether or not to select the file access path.

In operation 415, the second electronic device 120 can request the file from the server 140 in response to the selection. For example, as the file access path is selected, the second electronic device 120 can invoke a webpage including the file uploaded by the first electronic device 110 in the server 140. Alternatively, when the file access path and the thumbnail are received and the user selects the thumbnail, the second electronic device 120 can request a file relating to the thumbnail from the server 140.

In operation 417, the server 140 can send the requested file to the second electronic device 120. For example, when receiving the file request from the second electronic device 120 based on the file access path, the server 140 can obtain the authentication code in the file access path. The server 140 can determine whether the file is stored at a location corresponding to the authentication code in the database 330. The server 140 can send the identified file to the second electronic device 120 through the communication unit 320.

In operation 419, the second electronic device 120 can receive the file from the server 140 and store it in a memory (e.g., the memory 250). Hence, although the user (e.g., the second user) of the second electronic device 120 does not receive the file directly from the first electronic device 110, he/she can easily obtain the file uploaded by the first electronic device 110 in the server.

Figure 5:
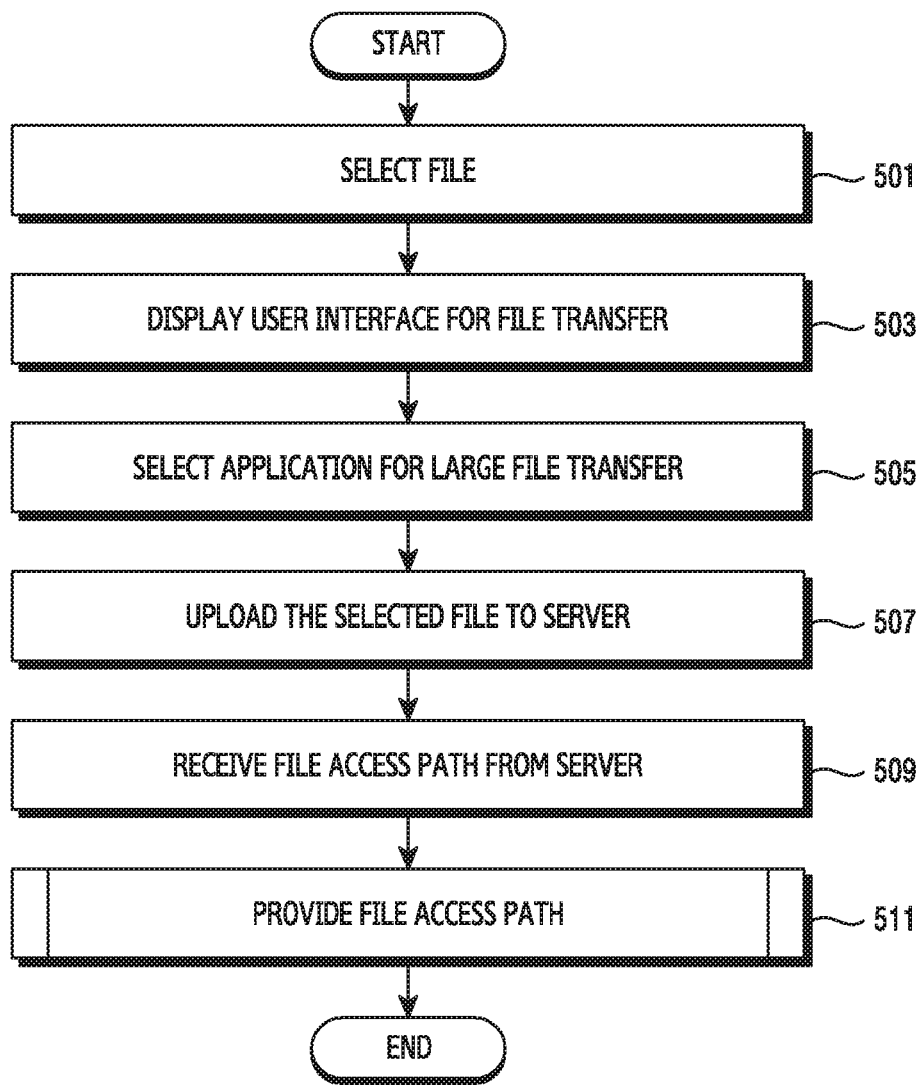
FIG. 5 is a flowchart illustrating an example file sharing method of an electronic device according to various example embodiments.

FIG. 5 is a flowchart illustrating an example file sharing method of an electronic device according to various example embodiments.

FIG. 5 illustrates, for example, and without limitation, "an operating method of an originating electronic device", where the first electronic device 110 shares a file with the second electronic device 120 through the server 140. To ease the understanding, an electronic device to be explained is executed by the electronic device of FIG. 2. Also, the server 140 is executed by the server 300 of FIG. 3.

Referring to FIG. 5, in operation 501, the electronic device 200 (e.g., the control unit 280) can select a file. For example, the control unit 280 can display files (e.g., texts, images, videos) (or a file list including one or more files) on the touch screen 230, and the user can select at least one of the displayed files through the user input unit 220. After selecting the file, the control unit 280 can request to send the selected file from the user through the user input unit 220. For example, if the file is a photo (e.g., image), the user can select several photos in a gallery application which offers captured photos and then press a send button. After the photo is selected, when detecting the user input which selects the send button, the control unit 280 can display a user interface for the file transfer.

In operation 503, the electronic device 200 (e.g., the control unit 280) can display the user interface for the file transfer. The control unit 280 can determine whether a size (e.g., volume, number) of the requested file exceeds a reference size, and provide a different user interface according to the reference size excess. For example, the control unit 280 can provide a user interface including at least one of an application for large file transfer, one or more applications for normal file transfer, and counterpart information. When the size of the requested file is considerable (e.g., exceeds the reference size), the control unit 280 can provide a first user interface including at least one of the large file transfer application, one or more applications for the normal file transfer, and the counterpart information. Alternatively, when the size of the requested file is small (e.g., falls below the reference size), the control unit 280 can provide a second user interface including at least one of one or more applications for the normal file transfer, and the counterpart information. The user can select the application or the counterpart information in the first user interface or the second user interface.

The control unit 280 can display the first user interface regardless of the reference size excess. When the file to send is destined for one or more counterparts, the control unit 280 can display the first user interface.

The reference size can be preset in the electronic device 200, or set by the user. The reference size can be received from a server such as base station and set in the electronic device 200. For example, the base station can differ per wireless communication service provider, and the reference size can differ per base station of the wireless communication service provider. When the electronic device 200 switches from a Subscriber Identification Module (SIM) (e.g., SIM card) of a first company to a SIM card of a second company in the wireless communication service, the electronic device 200 can receive a reference size from a base station of the second company and reset the reference size. That is, the reference size serviced from the base station of the first company can be different from the reference size serviced from the base station of the second company.

In operation 505, the electronic device 200 (e.g., the control unit 280) can select the large file transfer application. For example, the control unit 280 can receive the large file transfer application selected by the user in the first user interface or the second interface.

In operation 507, the electronic device 200 (e.g., the control unit 280) can upload the selected file to the server 300 through the wireless communication unit 210. The large file transfer application can upload the file to the server 300 without directly sending the file to the counterpart electronic device (e.g., the second electronic device 120). In the related art, the large file can be transmitted to the counterpart electronic device only after reducing the file size or resolution. In this case, the counterpart electronic device cannot receive the original file.

In the present disclosure, the original file is uploaded to the server 300 without reducing the size or the resolution of the large file, and thus the counterpart electronic device can receive the original file. Also, when the file is destined for one or more counterparts, the file is uploaded to the server 300 just once without having to send the file to each of the counterpart electronic devices and accordingly the counterpart electronic devices can receive the file from the server 300.

According to various embodiments, when sending the file to the server 300 through the large file transfer application, the electronic device 200 (e.g., the control unit 280) can set sharing information (e.g., file sharing information) including the counterpart (e.g., the second user of the second electronic device 120) who shares the file and the file sharing period (e.g., the file download expiration time). The control unit 280 can send the file sharing information and the file to the server 300 through the wireless communication unit 210.

In operation 509, the electronic device 200 (e.g., the control unit 280) can receive the file access path from the server 300 through the wireless communication unit 210. The file access path can indicate the storage location of the file uploaded to the server 300. For example, the file access path can be the address information including the address (e.g., URL) of the server 300 and the authentication code (e.g., PIN code) indicating the file storage location in the database 330 of the server 300.

In operation 511, the electronic device 200 (e.g., the control unit 280) can provide the file access path. For example, the control unit 280 can input the file access path in the input field in the currently executed application. Alternatively, the control unit 280 can select the application and the counterpart (e.g., the second user of the second electronic device 120) to send the file access path, and input the file access path in the input field of the selected application. When the send button is selected, the input file access path can be sent to the counterpart electronic device (e.g., the second electronic device 120) and shared with the counterpart electronic device. The electronic device 200 can share the file (e.g., a large file) with the counterpart electronic device through the server 300.

Figure 6:
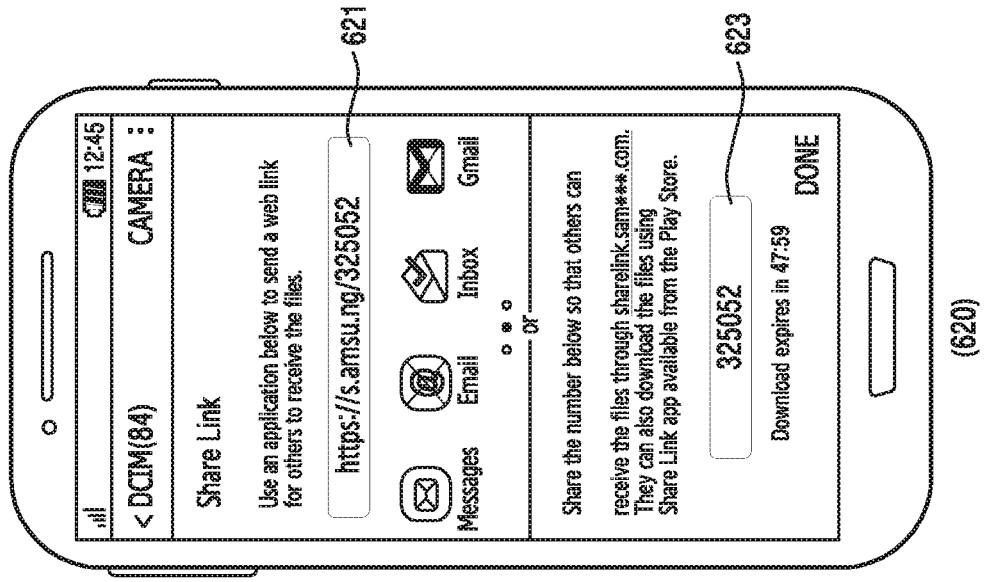
FIG. 6 is a diagram illustrating an example user interface for file sharing according to various example embodiments.
Figure 6:
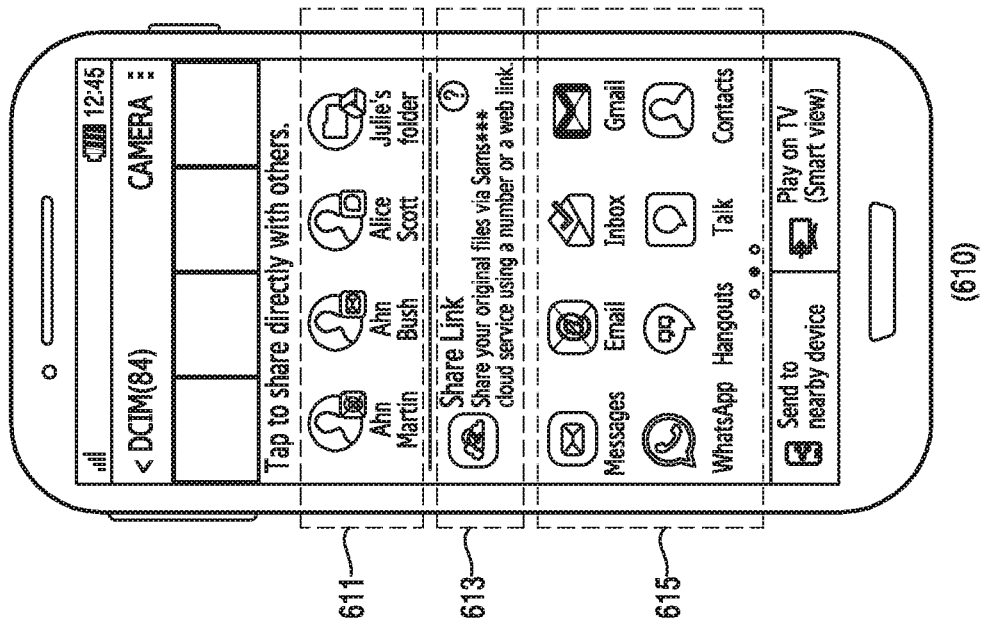

FIG. 6 is a diagram illustrating an example user interface for file sharing according to various example embodiments.

Referring to FIG. 6, the electronic device 200 (e.g., the control unit 280) can provide a user interface 610 for the file transfer. The user interface 610 can include counterpart information 611 for the file transfer, a large file transfer application 613, and an application list 615 including one or more applications for normal file transfer. The user interface 610 can be a first user interface provided when a requested file size exceeds a reference size. Alternatively, the user interface 610 can be provided when the file is destined for one or more counterparts (e.g., the second electronic device 120).

The counterpart information 611 for the file transfer can include a counterpart name (or image) and a file transfer application. The large file transfer application 613 can include an image (icon) related to the application and descriptive information of the application. The application list 615 can include images (e.g., icons) of the one or more normal file transfer applications. The control unit 280 can receive the selected counterpart name or file transfer application for the file transfer in the user interface 610 and perform an operation corresponding to the selected application.

In various embodiments, the electronic device 200 (e.g., the control unit 280) can provide a user interface 620 including a file access path. The user interface 620 can include address information 621 including an Internet address of the server 300 and an authentication code, and the authentication code 623. Herein, the address information 621 can indicate the file access path. The user interface 620 can display the address information 621 with a guidance message (e.g., text) notifying that an intended file can be downloaded using the address information 621. Also, the user interface 620 can provide the authentication code 623 with a guidance message (e.g., text) notifying that an intended file can be downloaded by accessing the server 300 and entering the authentication code 623. Accordingly, the user notifies the authentication code 623 to the counterpart so that the counterpart can easily download an intended file using the authentication code 623.

When the user selects the address information 621, the control unit 280 can enter the address information 621 in an input field of a running application. Alternatively, when the user selects the authentication code 623, the control unit 280 can enter the authentication code 623 in the input field of the running application. Alternatively, when the user selects the authentication code 623, the control unit 280 can access the server 300 and display a main page.

According to various embodiments, when the user selects the address information 621 or the authentication code 623, the control unit 280 can copy the address information 621 or the authentication code 623. Next, when the application is executed (selected) after copying the address information 621 or the authentication code 623, the control unit 280 can paste the copied address information 621 or authentication code 623 in the input field of the running application.

Figure 7:
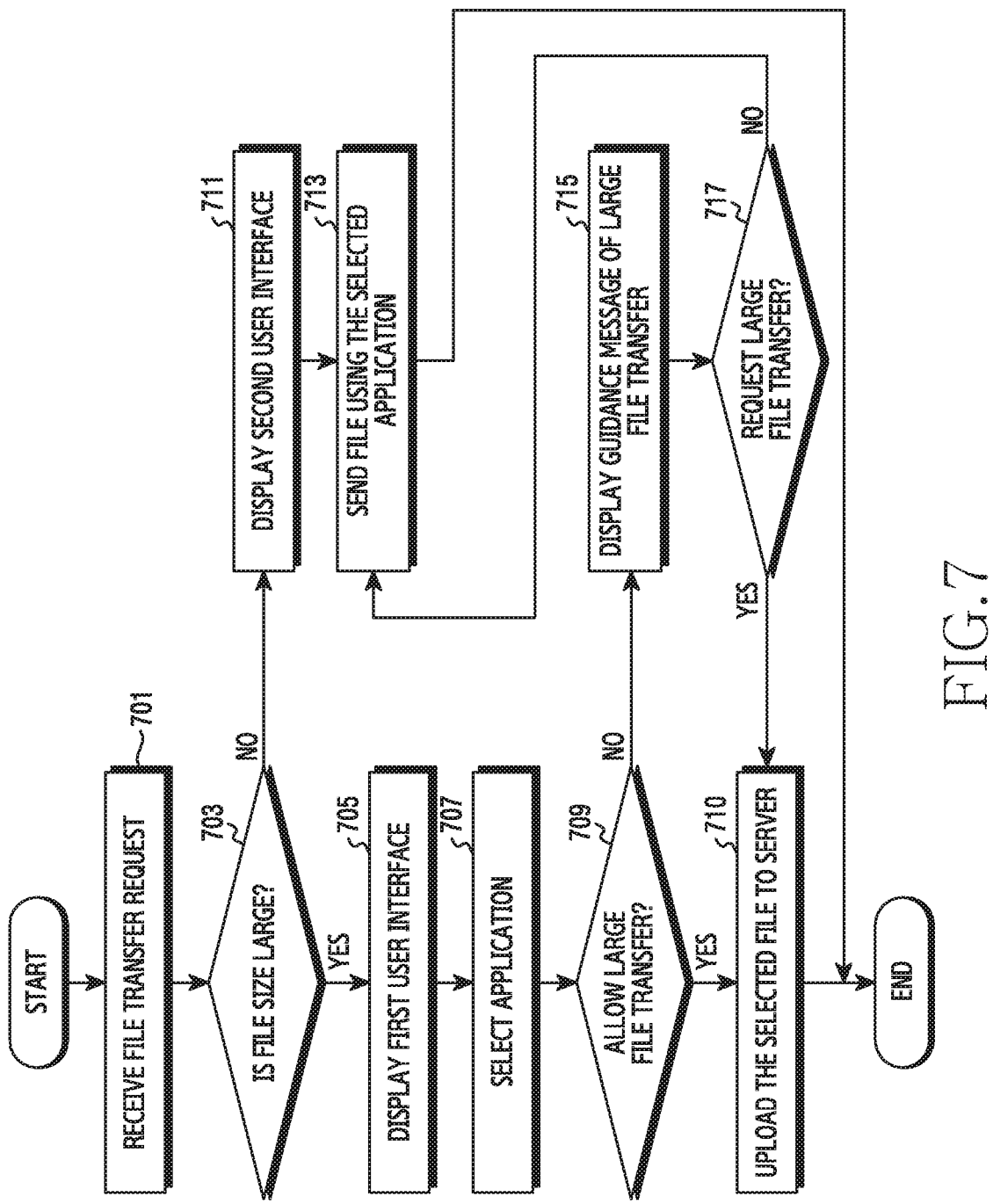
FIG. 7 is a flowchart illustrating an example transfer controlling method based on a file size in an electronic device according to various example embodiments.

FIG. 7 is a flowchart illustrating an example transfer controlling method based on a file size in an electronic device according to various example embodiments.

FIG. 7 is a detailed flowchart of the operation 503 and the operation 505 of FIG. 5. Referring to FIG. 7, in operation 701, the electronic device 200 (e.g., the control unit 280) can receive a file transfer request. For example, the control unit 280 can select a file to send and then detect a user input which selects a send button or an OK button.

In operation 703, the electronic device 200 (e.g., the control unit 280) can determine whether a size of the requested file is large in size. For example, the control unit 280 can determine whether the size (e.g., volume, number) of the requested file exceeds a reference size. The reference size can be preset in the electronic device 200, or set by the user of the electronic device 200.

The control unit 280 can perform operation 705 for the large file. Otherwise, the control unit 280 can perform operation 711.

In operation 705, the electronic device 200 (e.g., the control unit 280) can display a first user interface. If the size of the requested file exceeds the reference size, the control unit 280 can provide the first user interface. The first user interface can include at least one of a large file transfer application, an application list including one or more normal file transfer applications, and counterpart information (e.g., counterpart image and application image) for the file transfer.

When the file is destined for one or more counterparts (e.g., the second electronic device 120), the control unit 280 according to various example embodiments can provide the first user interface. For example, when the file is destined for one or more counterparts, the control unit 280 can provide the first user interface regardless of the file size. Alternatively, when the file size exceeds the reference size and the file is destined for one or more counterparts, the control unit 280 can provide the first user interface.

In operation 707, the electronic device 200 (e.g., the control unit 280) can detect a user input which selects the application in the first user interface. For example, the control unit 280 can select the large file transfer application in the first user interface. Alternatively, the control unit 280 can select the normal file transfer application or the counterpart information.

In operation 709, the electronic device 200 (e.g., the control unit 280) can determine whether the selected application is the large file transfer application and whether to allow the large file transfer.

The control unit 280 can perform operation 710 when the selected application is the large file transfer application, and perform operation 715 when the selected application is not the large file transfer application.

In operation 710, the electronic device 200 (e.g., the control unit 280) can upload the file to the server 300 through the large file transfer application.

In operation 711, the electronic device 200 (e.g., the control unit 280) can display a second user interface. When the size of the requested file does not exceed the reference size, the control unit 280 can provide the second user interface. The second user interface can include the application list including one or more normal file transfer applications, and the counterpart information. For example, when the size of the requested file does not exceed the reference size, the control unit 280 may not provide the large file transfer application.

The electronic device 200 can detect a user input which selects the application in the second user interface. For example, the control unit 280 can select the normal file transfer application or the counterpart information in the second user interface.

In operation 713, the electronic device 200 (e.g., the control unit 280) can send the file using the selected application. For example, the control unit 280 can send the file to the second electronic device 120 using the normal file transfer application.

When the large transfer is not feasible, the electronic device 200 (e.g., the control unit 280) can display a guidance message regarding the large transfer as a popup window in operation 715. For example, the control unit 280 can include in the guidance message a text "Files to send are too large and need to reduce the size or resolution to send them using the normal file transfer application" and a button (e.g., a large transfer button). Also, the control unit 280 can include in the guidance message a text "Original files can be transferred using the large file transfer application" and a button (e.g., a normal transfer button). Also, the control unit 280 can include in the guidance message a CANCEL button which cancels the transmit request of the selected file.

In operation 717, the electronic device 200 (e.g., the control unit 280) can detect a user input and determine whether the detected user input is a large transfer request. For example, if the user input selects the large transfer button, the control unit 280 can perform operation 710. Alternatively, if the user input selects the normal transfer button, the control unit 280 can perform operation 713. Alternatively, if the user input selects the CANCEL button, the control unit 280 can finish this process without carrying out the file transfer operations.

Figure 8:
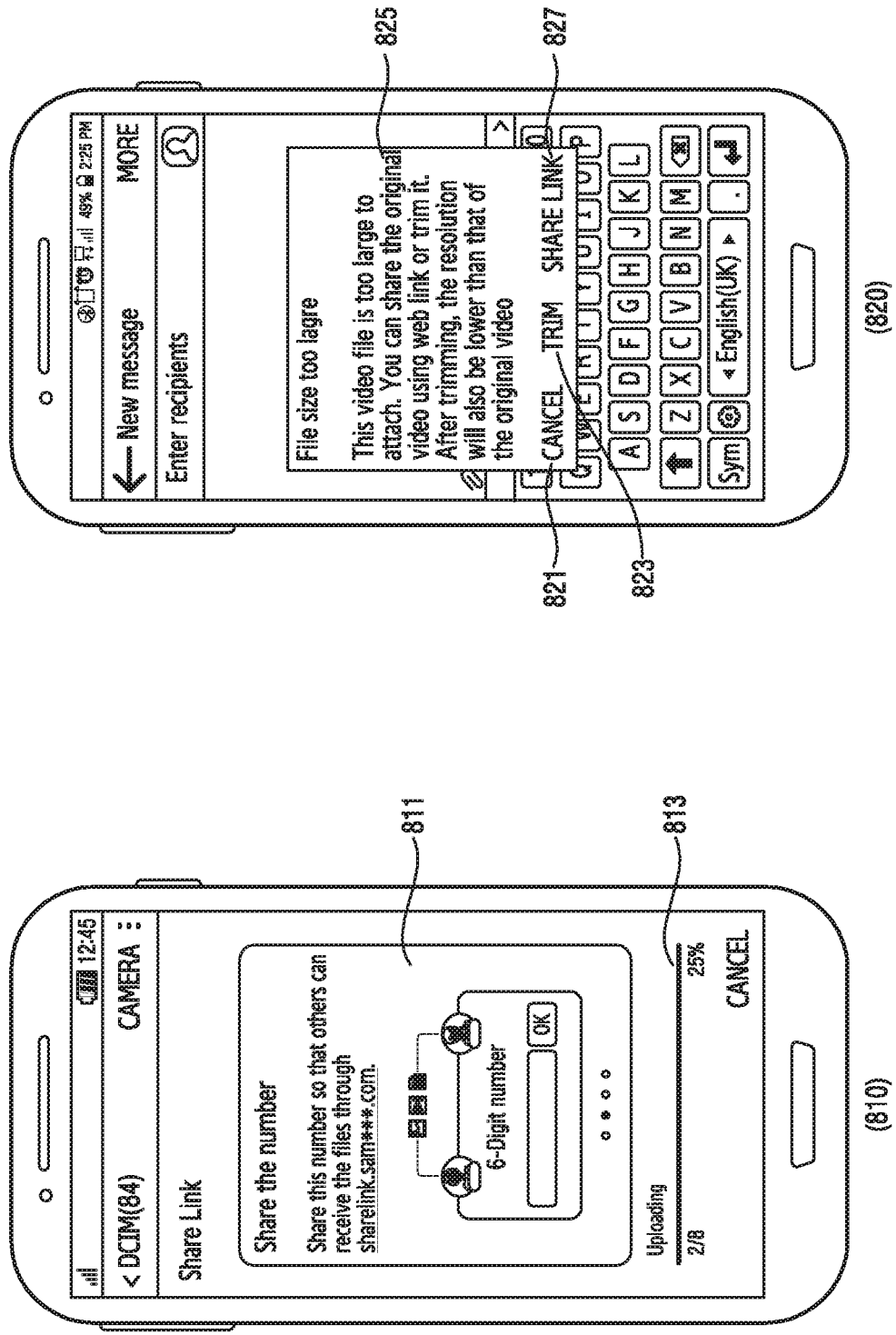
FIG. 8 is a diagram illustrating an example user interface for large file transfer according to various example embodiments.

FIG. 8 is a diagram illustrating an example user interface for large file transfer according to various example embodiments.

Referring to FIG. 8, the electronic device 200 (e.g., the control unit 280) can display a user interface 810 during file upload to the server 300. For example, the user interface 810 can include a guidance message 811 notifying that original files can be uploaded to a server and a third party can download the original files with an authentication code, and upload state information 813.

The electronic device 200 (e.g., the control unit 280) according to various embodiments can display a user interface 820 including a guidance message for the large file transfer. When the user requests the large file transfer but the application selected by the user does not allow the large file transfer, the control unit 280 can provide the user interface 820. The user interface 820 can include a text 825 and buttons 821, 823, and 827. The text 825 can include contents that the size of the requested file is too large and needs to reduce its file size or resolution to send using the normal file transfer application, or the original file can be transmitted using the large file transfer application. The buttons 821, 823, and 827 can include the CACEL button 821 for canceling the file transfer request, the normal transfer button (TRIM) 823, and the large file transfer button (SHARE LINK) 827.

Figure 9:
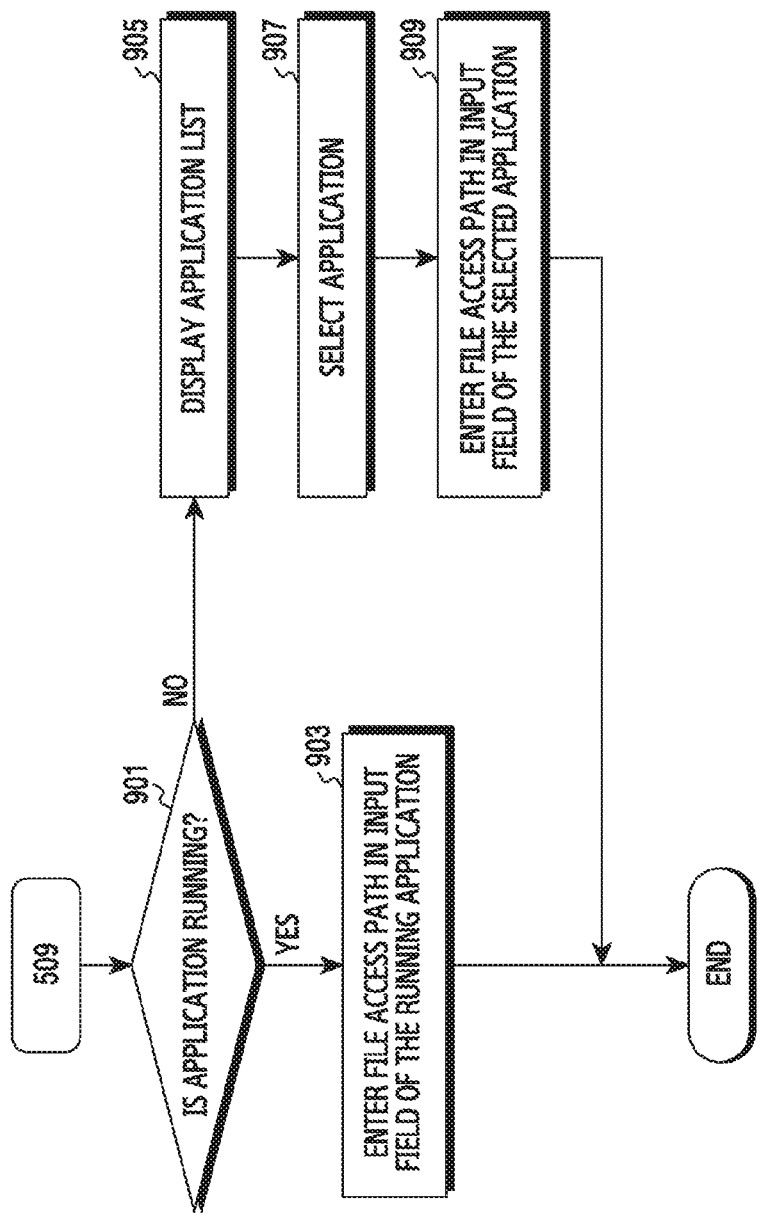
FIG. 9 is a flowchart illustrating an example file access path providing method of an electronic device according to various example embodiments.

FIG. 9 is a flowchart illustrating an example file access path providing method of an electronic device according to various example embodiments.

FIG. 9 illustrates a detailed subroutine of the operation 511 of FIG. 5. Referring to FIG. 9, in operation 901, the electronic device 200 (e.g., the control unit 280) can determine whether an application is running (or executing). When receiving a file access path through the wireless communication unit 210, the control unit 280 can determine whether an application is running. The running application can indicate an application selected when the user requests the file transfer. For example, when the user selects a message application as the file transfer application, the message application cannot transmit a large file and accordingly the control unit 280 can send the file to the server 300 using a large file transfer application based on the user selection. Next, when receiving a file access path from the server 300, the control unit 280 can determine the message application as the running application.

Alternatively, when the user requests the file transfer while messaging with a counterpart (e.g., the second user of the second electronic device 120) using the message application, the control unit 280 can determine the messenger application as the running application.

The control unit 280 can perform operation 903 when the application is running, and perform operation 905 when no application is running.

In operation 903, the electronic device 200 (e.g., the control unit 280) can input a file access path in an input field of the running application. For example, when the user requests the file transfer during chatting (dialogue) with the counterpart, the control unit 280 can automatically input the file access path in the input field of a chatting application. In this case, when the user selects a send button, the file access path can be transmitted in a chatting window (or dialogue thread) with the counterpart in the chatting application. Alternatively, when a counterpart to send the file access path is not selected in the running application, the control unit 280 can display a counterpart list (or a chatting room list) in the running application. The control unit 280 can receive one or more counterparts selected by the user from the counterpart list, and send the file access path in the chatting window of the selected counterpart. When the file access path is transmitted, the file access path can be displayed in the chatting window of the counterpart.

In operation 905, the electronic device 200 (e.g., the control unit 280) can display an application list. The control unit 280 can receive the selected application to send the file access path, from the user. The control unit 280 can display the application list including one or more applications for sending the file access path to the counterpart. Alternatively, the control unit 280 can display a user interface including the application list and counterpart information (e.g., a counterpart image and an application image (e.g., icon)).

In operation 907, the electronic device 200 (e.g., the control unit 280) can receive an input to select an application.

In operation 909, the electronic device 200 (e.g., the control unit 280) can input the file access path in an input field of the selected application. The control unit 280 can display a counterpart list (or a chatting room list) in the selected application, and receive one or more counterparts selected by the user in the counterpart list. The control unit 280 can send (display) the file access path in the chatting window with the selected counterpart. When the counterpart is selected, the control unit 280 can automatically input the file access path in the input field of the chatting window of the selected counterpart. When the user selects the send button, the control unit 280 can send the file access path entered in the input field.

Figure 10:
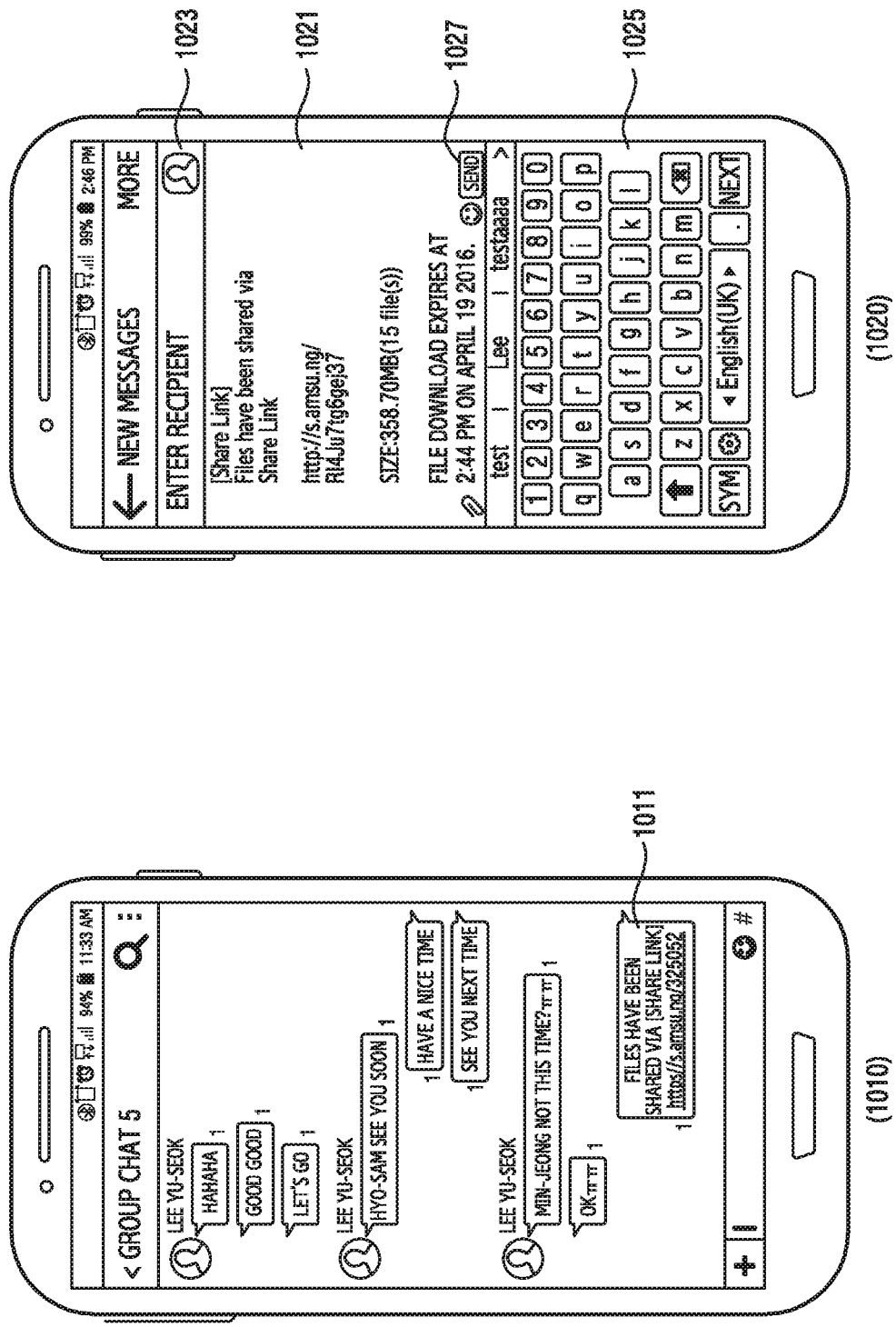
FIG. 10 is a diagram illustrating an example user interface for sharing a file access path according to various example embodiments.

FIG. 10 is a diagram illustrating an example user interface for sharing a file access path according to various example embodiments.

Referring to FIG. 10, the electronic device 200 (e.g., the control unit 280) can provide a user interface 1010 which shares a file access path 1011 with the second electronic device 120. The control unit 280 can enter the file access path 1011 in an input field of an application (e.g., a messenger application), and send the file access path 1011 when the send button is selected. When the file access path 1011 is transmitted, the file access path 1011 can be displayed in the chatting window of the counterpart.

The electronic device 200 (e.g., the control unit 280) can provide a user interface 1020 which enters a file access path in an input field of a running application (e.g., a message application). The user interface 1020 can include a counterpart contact input field 1023, a message content input field 1021, a send button 1027, and a keypad 1025. A phone number of the second electronic device 120 can be entered in the counterpart contact input field 1023. A message content to send to the second electronic device 120 can be entered in the message content input field 1021. The control unit 280 can provide the keypad 1025 for entering the phone number in the counterpart contact input field 1023 or contents to send in the message content input field 1021. Upon receiving the file access path, the control unit 280 can automatically enter the file access path in the message content input field 1021. When the user selects the send button 1027, the control unit 280 can send the message content (e.g., the file access path) entered in the message content input field 1021, to an electronic device of the phone number entered in the counterpart contact input field 1023.

Figure 11:
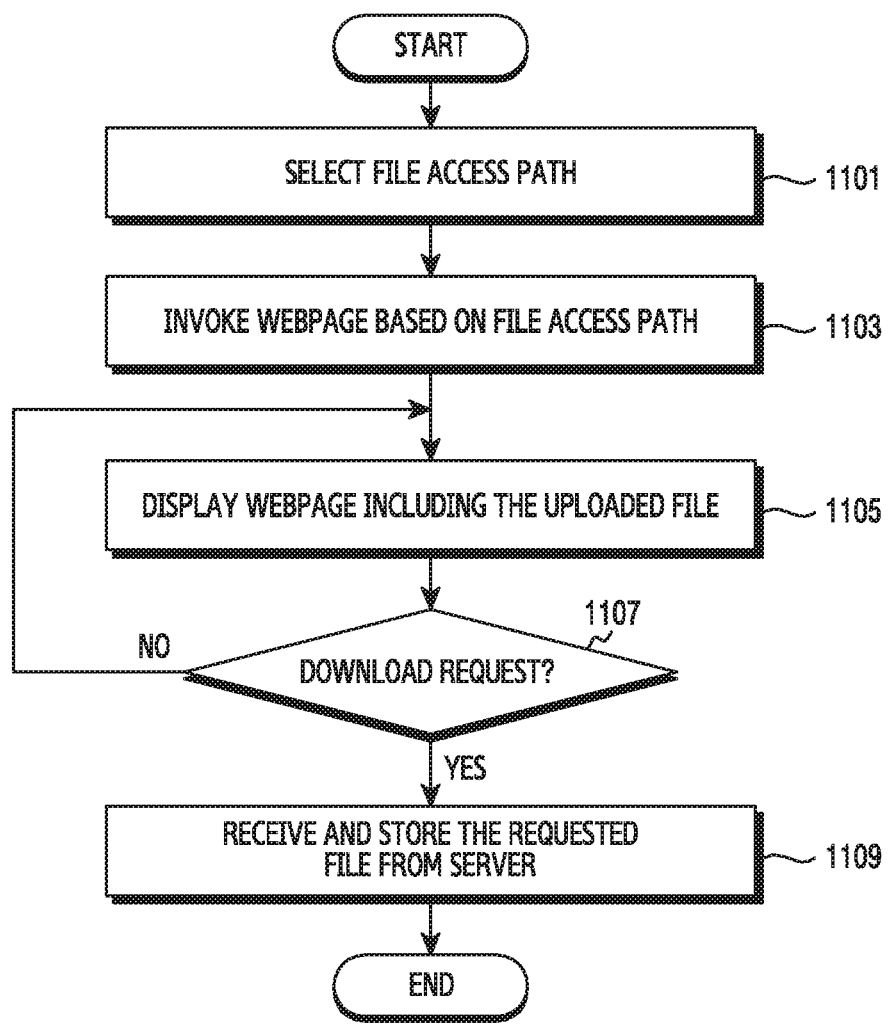
FIG. 11 is a flowchart illustrating an example file downloading method using a file access path of an electronic device according to various example embodiments.

FIG. 11 is a flowchart illustrating an example file downloading method using a file access path in an electronic device according to various example embodiments.

FIG. 11 illustrates, for example, and without limitation, "an operating method of a receiving electronic device", where the second electronic device 120 downloads a file from the server 140. To facilitate the understanding, the electronic device to be described is executed by the electronic device of FIG. 2. The server 140 is executed by the server 300 of FIG. 3.

Referring to FIG. 11, in operation 1101, the electronic device 200 (e.g., the control unit 280) can select a file access path. For example, the control unit 280 can select a user input which selects the file access path. In operation 1103, the electronic device 200 (e.g., the control unit 280) can invoke a webpage based on the file access path. The file access path includes an address of the server 300 and an authentication code indicating a storage location of the file. The control unit 280 can access the server 300 based on the file access path, and request the file stored at the storage location corresponding to the authentication code from the server 300.

When receiving the file access path and a thumbnail from the first electronic device 110 and detecting a user input which selects the thumbnail, the control unit 280 according to various embodiments can invoke a webpage based on the file access path. When detecting the user input which selects the thumbnail, the control unit 280 can enlarge the thumbnail on the display 231. When detecting a user input which selects the file access path, the control unit 280 can invoke the webpage.

In operation 1105, the electronic device 200 (e.g., the control unit 280) can display a webpage including a file uploaded by the first electronic device 110. The control unit 280 can receive from the server 300 the webpage including the file uploaded by the first electronic device 110 according to the request. The control unit 280 can display the received webpage on the display 231.

In operation 1107, the electronic device 200 (e.g., the control unit 280) can determine whether downloading is requested. The user can select his/her intended file on the webpage and select a download button. When the download button is selected, the control unit 280 can determine the download request. The control unit 280 can request the server 300 to download the file selected by the user.

In operation 1109, the electronic device 200 (e.g., the control unit 280) can receive the requested file from the server 300 and store the requested file in the memory 250. The control unit 280 can receive the requested file through the wireless communication unit 110 and store the received file in the memory 250.

Figure 12:
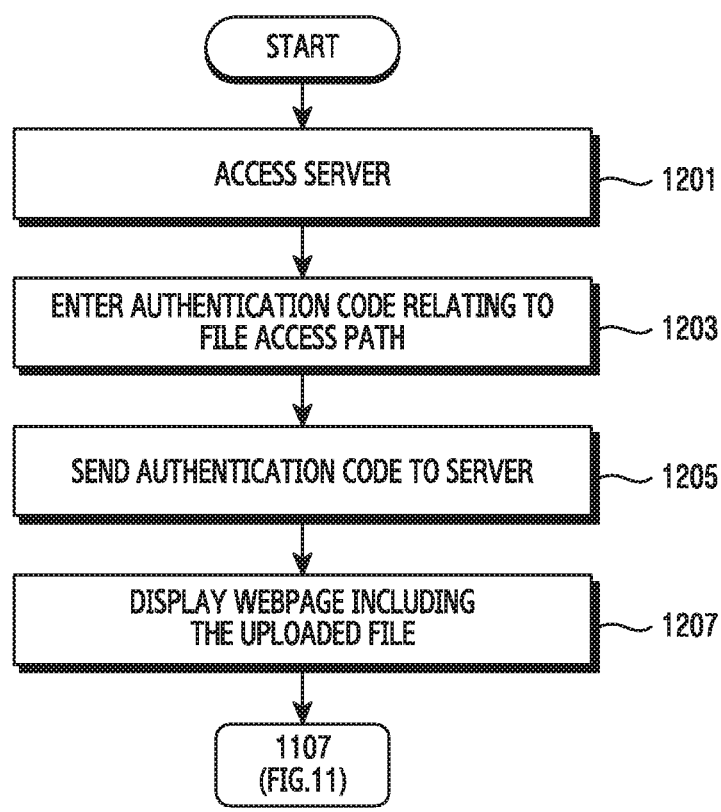
FIG. 12 is a flowchart illustrating an example file downloading method using an authentication code of an electronic device according to various example embodiments.

FIG. 12 is a flowchart illustrating an example file downloading method using an authentication code of an electronic device according to various example embodiments.

Referring to FIG. 12, in operation 1201, the electronic device 200 (e.g., the control unit 280) can access the server 300. For example, the control unit 280 can access the server 300 by entering an address of the server 300 in an Internet address window (e.g., an Internet address input field).

In operation 1203, the electronic device 200 (e.g., the control unit 280) can enter an authentication code relating to a file access path. Upon accessing the server 300, the control unit 280 can display a main page of the server 300 on the display 231. The main page of the server 300 can include an input field for entering the authentication code. The control unit 280 can input the authentication code in the input field. Alternatively, the control unit 280 can execute a large file transfer application and display a page for the authentication code input in the executed application. The control unit 280 can input the authentication code in the input field of the page.

In operation 1205, the electronic device 200 (e.g., the control unit 280) can send the input authentication code to the server 300. The authentication code can indicate a file storage location in the database 330 of the server 300.

In operation 1207, the electronic device 200 (e.g., the control unit 280) can display a webpage including a file uploaded by the first electronic device 110. The control unit 280 can receive from the server 300 the webpage including the file uploaded by the first electronic device 110 according to the authentication code transmission. The control unit 280 can display the received webpage on the display 231.

After operation 1207, the control unit 280 can perform the operations 1107 and 1109 of FIG. 11.

Figure 13:
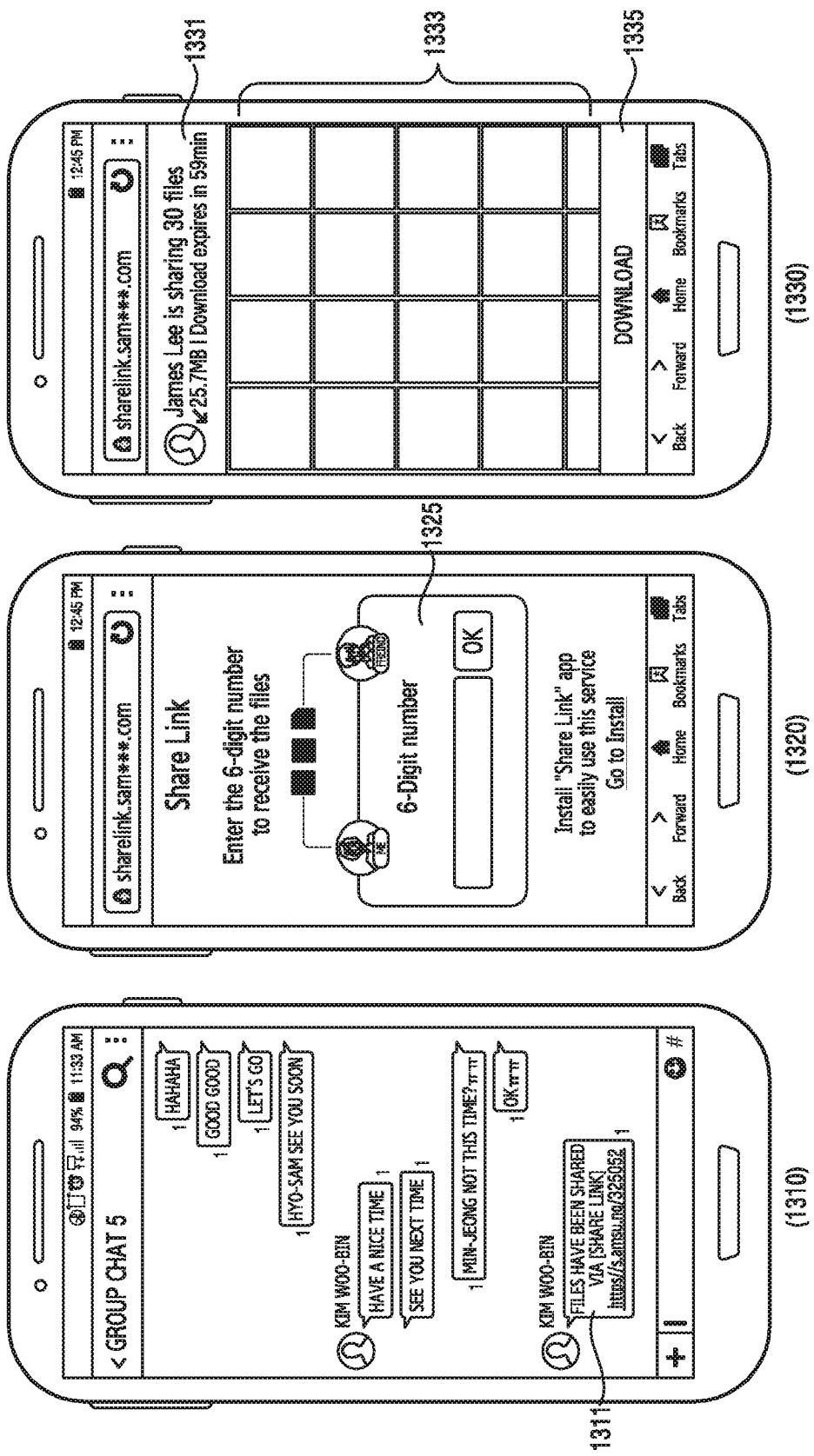
FIG. 13 is a diagram illustrating an example user interface for downloading a file according to various example embodiments.

FIG. 13 is a diagram illustrating an example user interface for downloading a file according to various example embodiments.

Referring to FIG. 13, the electronic device 200 (e.g., the control unit 280) can provide a user interface 1310 receiving a file access path 1311 from the first electronic device 110. Upon receiving the file access path 1311 from the first electronic device 110, the user interface 1310 can display the file access path 1311 in a chatting window of the first user of the first electronic device 110.

According to various embodiments the electronic device 200 (e.g., the control unit 280) can provide a user interface 1320 including an input field 1325 for entering an authentication code. For example, the user interface 1320 can be a main page of the server 300. Alternatively, the user interface 1320 can be a page for inputting the authentication code in a large file transfer application.

According to various embodiments the electronic device 200 (e.g., the control unit 280) can provide a user interface 1330 including a file uploaded by the first electronic device 110. The user interface 1330 can be a webpage screen including the file uploaded by the first electronic device 110. The user interface 1330 can include uploaded file information 1331, images 1333 of the uploaded files, and a download button 1335. The file information 1331 can include a user name of the first electronic device 110, and the number or size of the uploaded files.

Figure 14:
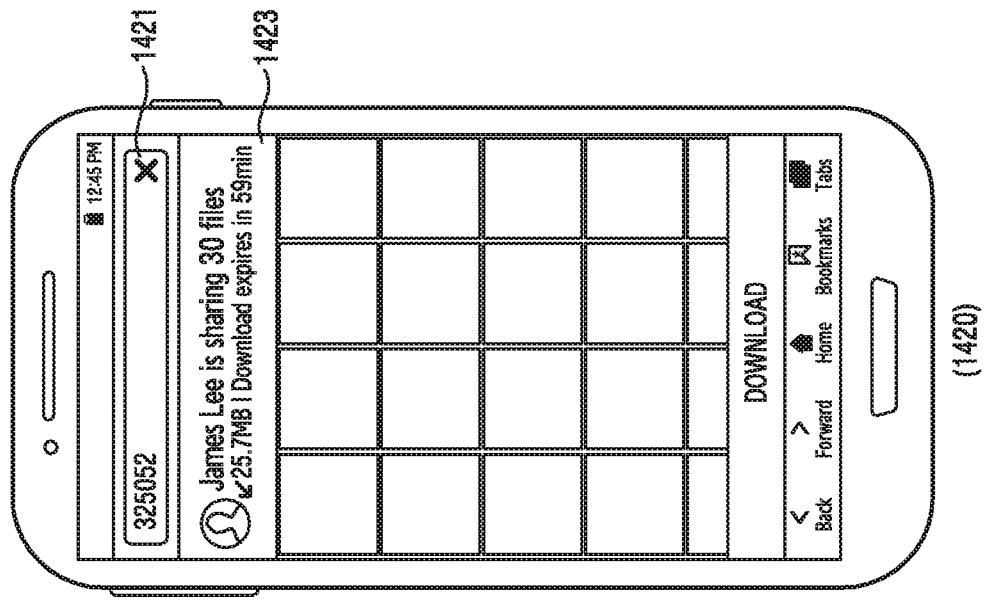
FIG. 14 is a diagram illustrating an example user interface of an application related to a large file according to various example embodiments.
Figure 14:
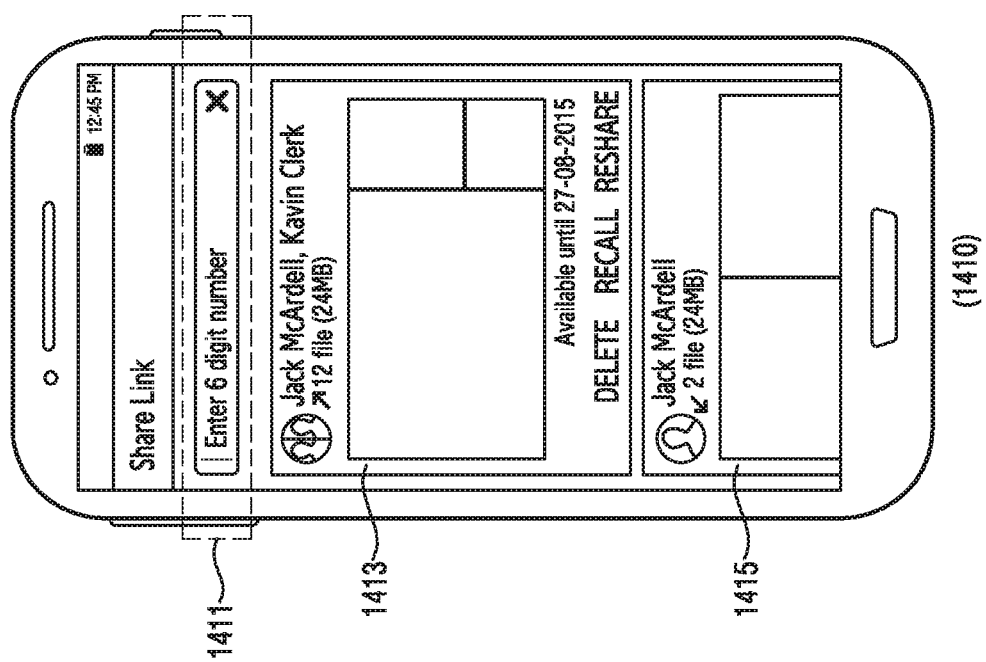

FIG. 14 illustrates an example user interface of a large file related application according to various example embodiments.

Referring to FIG. 14, according to various embodiments the electronic device 200 (e.g., the control unit 280) can display a user interface 1410 regarding file transfer/receive logs. The user interface 1410 can include the logs of the files uploaded or downloaded by the user to or from the server 300. For example, the user interface 1410 can include an authentication code input field 1411 for inputting an authentication code, uploaded file information 1413, and downloaded file information 1415.

The user can immediately obtain his/her intended file by inputting the authentication code in the authentication code input field 1411. The uploaded file information 1413 can include at least one of counterpart information (e.g., Jack McArdell, Kavin Clerk) who downloads the uploaded file, the number of files (e.g., 12 files), a file size (file capacity) (e.g., 24 MB), and file images. The downloaded file information 1415 can include at least one of counterpart information who downloads the files, the number of the files, the file size, and file images.

According to various embodiments the electronic device 200 (e.g., the control unit 280) can provide a user interface 1420 including a file list relating to an authentication code. When the user enters an authentication code (e.g., 325052) in an authentication code input field 1421, the server 30 can provide file information 1423 stored at a storage location corresponding to the authentication code. The file information 1423 can include user information (e.g., James Lee is sharing 20 files), the number of files (e.g., 30 files), the file size (e.g., 25.7 MB), and a download period (e.g., Download expires in 59 min) (or a sharing period) of the uploaded file. The user can select his/her intended file in the user interface 1420, press the download button, and thus download the file from the server 300.

Figure 15:
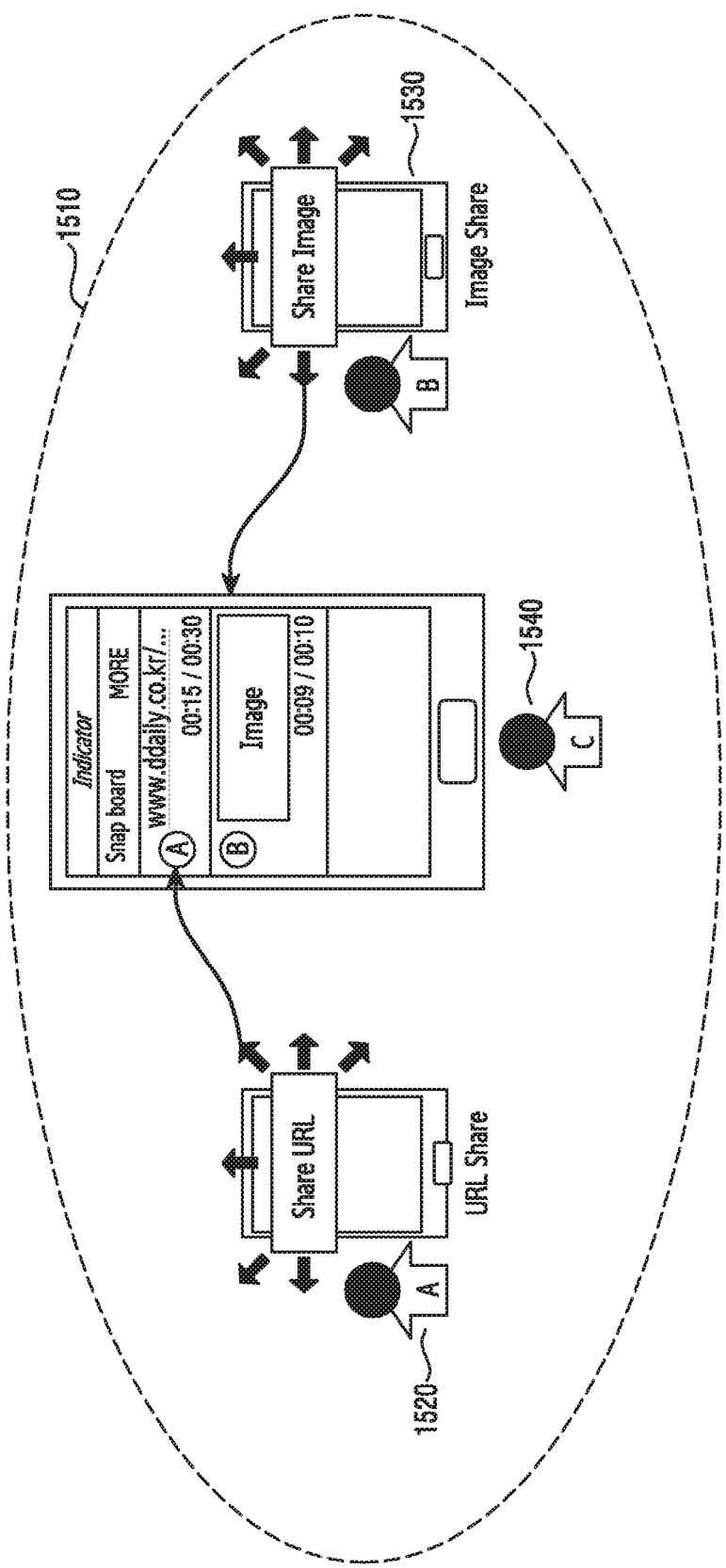
FIG. 15 is a diagram illustrating an example network environment for sharing a file using a sharing channel according to various example embodiments.

FIG. 15 is a diagram illustrating an example network environment for sharing a file using a sharing channel according to various example embodiments.

Referring to FIG. 15, a first electronic device A 1520 can share a file access path (e.g., URL) for a certain period inside a sharing area 1510. The first electronic device 1520 can set setting information (e.g., sharing configuration information) to share the file access path and thus provide the file access path in a short range. For example, the sharing configuration information can include at least one of a sharing period, a sharing counterpart, a sharing channel, and a sharing authentication code (e.g., a password) of the file.

A second electronic device B 1530 can share an image in the sharing area 1510. The second electronic device 1530 can set sharing configuration information to share the image and thus provide the image in a short range. The second electronic device 1530 can permit access to a particular data region in the memory 250.

A third electronic device C 1540 can scan its perimeter and collect sharing signals. For example, the third electronic device 1540 can obtain the sharing information in the sharing area 1510. For example, the third electronic device 1540 can access the sharing area 1510 over a particular channel (e.g., application or widget) and obtain a sharing list using sharing information (e.g., a name of a user, a phone number, a user account (account ID) of a user). The sharing list can include sharing information including a file access path (e.g., www.ddaily.co.kr) shared with the first electronic device A 1520 and sharing information including the image shared with the second electronic device B 1530.

The third electronic device 1540 can share the sharing information in the sharing list. The third electronic device 1540 can execute an application relating to the sharing information based on the sharing information. For example, when receiving schedule information via the file access path, the third electronic device 1540 can execute a calendar application. Alternatively, when receiving contact information via the file access path, the third electronic device 1540 can execute a contact application. Alternatively, when receiving the image, the third electronic device 1540 can execute a gallery application.

The sharing area 1510 can be a WLAN area such as Access Point (AP), a communication coverage area (e.g., communication coverage) of the first electronic device 1520, or a communication coverage area of the second electronic device 1530. According to various embodiments the first electronic device 1520 or the second electronic device 1530 can open or close the sharing channel of the sharing configuration information. For example, when the sharing period expires, the first electronic device 1520 or the second electronic device 1530 can close the sharing channel for the sake of security. When a counterpart not included in the sharing counterpart list pools the sharing information, the first electronic device 1520 or the second electronic device 1530 can set the sharing configuration information to conduct an additional security procedure (e.g., to enter the sharing authentication code or to identify the sharer).

Figure 16:
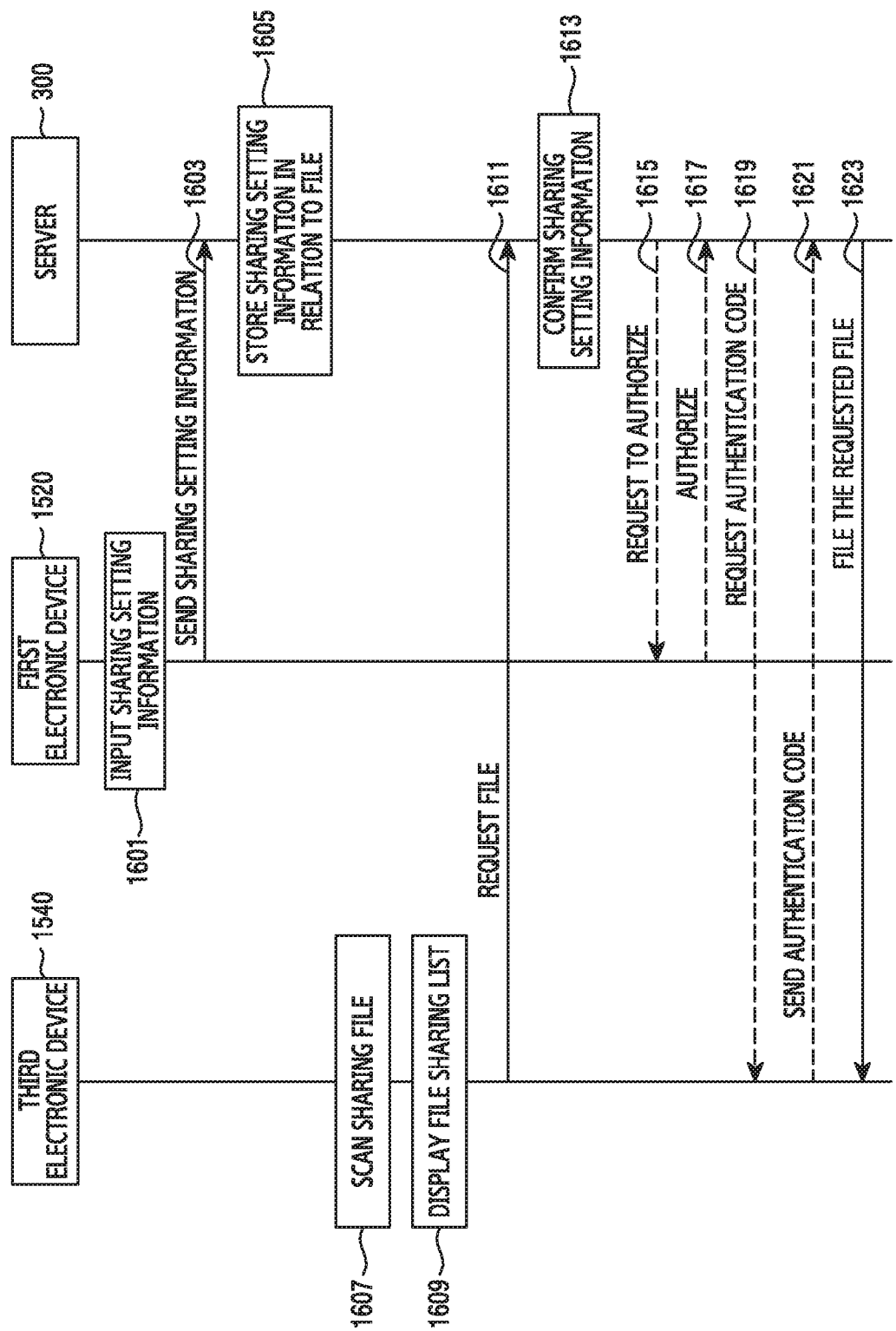
FIG. 16 is a flowchart illustrating an example file sharing method using sharing configuration information in an electronic device and a server according to various example embodiments.

FIG. 16 is a flowchart illustrating an example file sharing method using sharing configuration information in an electronic device and a server according to various example embodiments.

FIG. 16 illustrates the method for sharing a file by further setting sharing configuration information in the file sharing of FIG. 4. Hence, operations in FIG. 16 may be carried out together with the operations 401 through 409, or after the operation 409 of FIG. 4.

Referring to FIG. 16, in operation 1601, the first electronic device 1520 can receive input of the sharing configuration information. For example, the sharing configuration information can include at least one of a sharing period, a sharing counterpart, a sharing channel, and a sharing authentication code of a file uploaded by the first electronic device 1520. When the user requests the file sharing (transfer), the first electronic device 1520 can receive the sharing configuration information.

In operation 1603, the first electronic device 1520 can send the sharing configuration information to the server 300. In operation 1605, the server 300 can store the sharing configuration information in association with the file.

According to various embodiments, the first electronic device 1520 can store the sharing configuration information in the memory 250 without sending it to the server 300. In this case, the first electronic device 1520 can directly process a sharing request of the third electronic device 1520 based on the sharing configuration information stored in the memory 250.

In operation 1607, the third electronic device 1540 can scan the sharing file. For example, the third electronic device 1540 can scan an electronic device which shares the file in the sharing area 1510. The scanning can be an operation for connecting to a device such as AP or for interconnecting electronic devices.

In operation 1609, the third electronic device 1540 can display a file sharing list. The third electronic device 1540 can display the file sharing list including the scanned electronic device and file information shared by the electronic device, as a user interface.

In operation 1611, the third electronic device 1540 can select intended file information to share in the file sharing list and then request the file. For example, the third electronic device 1540 can request the file from the server 300, or request the file directly from the first electronic device 1520. In the following, the file is requested to the server 300. Notably, when the third electronic device 1540 requests the file directly from the first electronic device 1520, the first electronic device 1520 can perform operations 1613, 1619, and 1623 of the server 300. In operation 1613, the server 300 can obtain the sharing configuration information. For example, when the third electronic device 1540 requests the file shared by the first electronic device 1520, the server 300 can obtain the sharing configuration information of the file uploaded by the first electronic device 1520.

In operation 1615, the server 300 request the first electronic device 1520 to authorize based on the sharing configuration information. According to the sharing configuration information, when a user not included in the sharing counterpart list requests the file sharing, the sharer can be authorized and then share the file. In this case, the server 300 can request to authorize the file sharing of the third electronic device 1540 to the first electronic device 1520. In operation 1617, the first electronic device 1520 can permit the file sharing of the third electronic device 1540. Since the file sharing is permitted, the server 300 can send the file to the third electronic device 1540 in operation 1623.

According to various embodiments, the first electronic device 1520 can confirm (or identify) the sharing configuration information stored in the memory 250 according to the file sharing request of the third electronic device 1540. The user can determine in the first electronic device 1520 whether to allow the file sharing request of the third electronic device 1540 according to the sharing configuration information. When the user selection approves the sharing request, the first electronic device 1520 can send the file to the third electronic device 1540.

In operation 1619, the server 300 can request the authentication code from the third electronic device 1540 based on the sharing configuration information. According to the sharing configuration information, when the user not included in the sharing counterpart list requests the file sharing, the file can be shared after entering the authentication code. Alternatively, even when the sharing configuration information does not set the sharing counterpart list, the file can be shared after inputting the authentication code. In operation 1621, the third electronic device 1540 can send the requested authentication code. When the authentication code matches the authentication code of the sharing configuration information, the server 300 can send the file to the third electronic device 1540 in operation 1623.

According to various embodiments, the first electronic device 1520 can confirm the sharing configuration information stored in the memory 250 according to the file sharing request of the third electronic device 1540. The first electronic device 1520 can request the third electronic device 1540 to send the authentication code according to the sharing configuration information. The first electronic device 1520 can receive the authentication code from the third electronic device 1540 according to the request, and send the file to the third electronic device 1540 when the received authentication code matches the authentication code of the sharing configuration information.

Figure 17A:
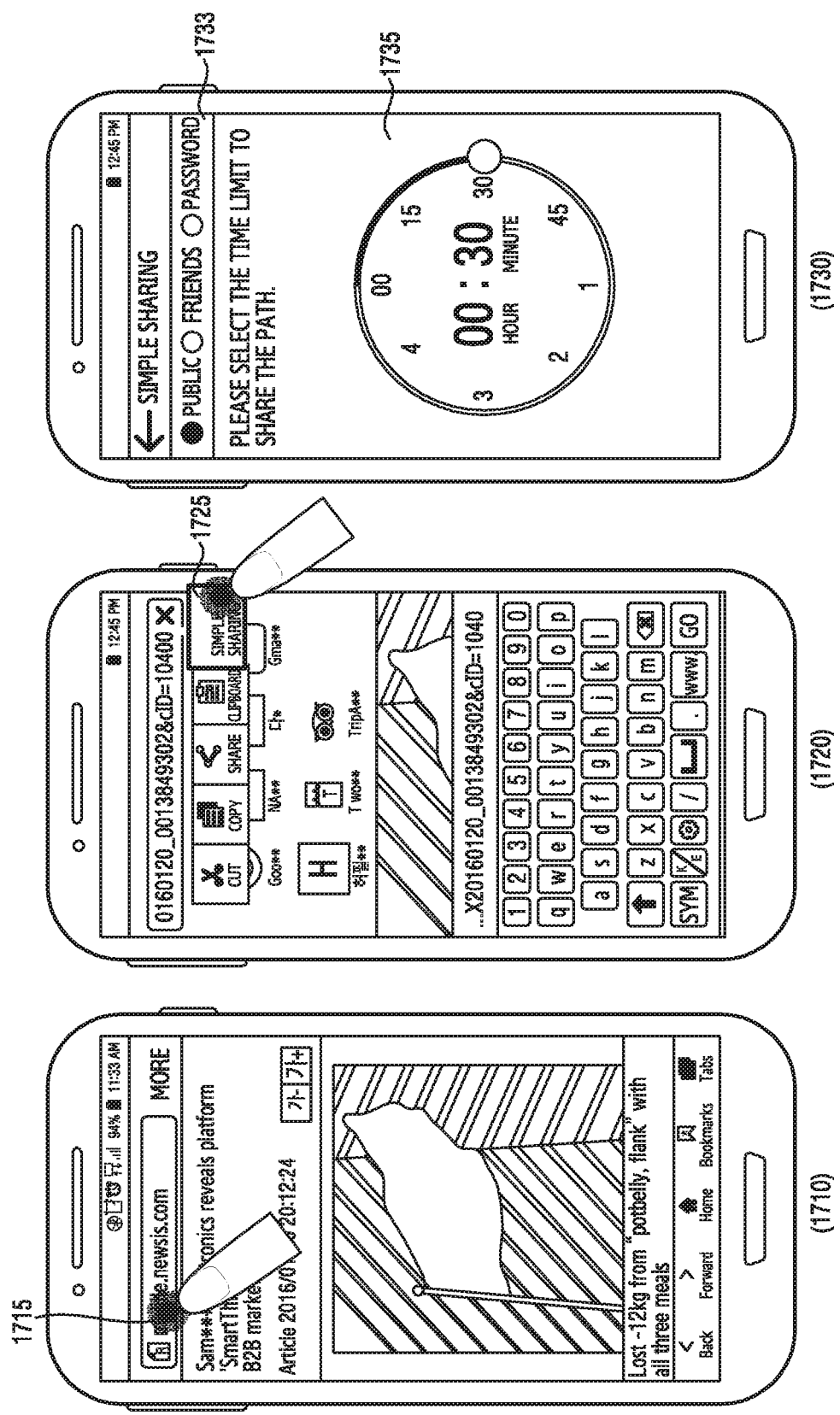
FIGS. 17A, 17B, and 17C are diagrams illustrating an example user interface for setting sharing configuration information according to various example embodiments.
Figure 17B:
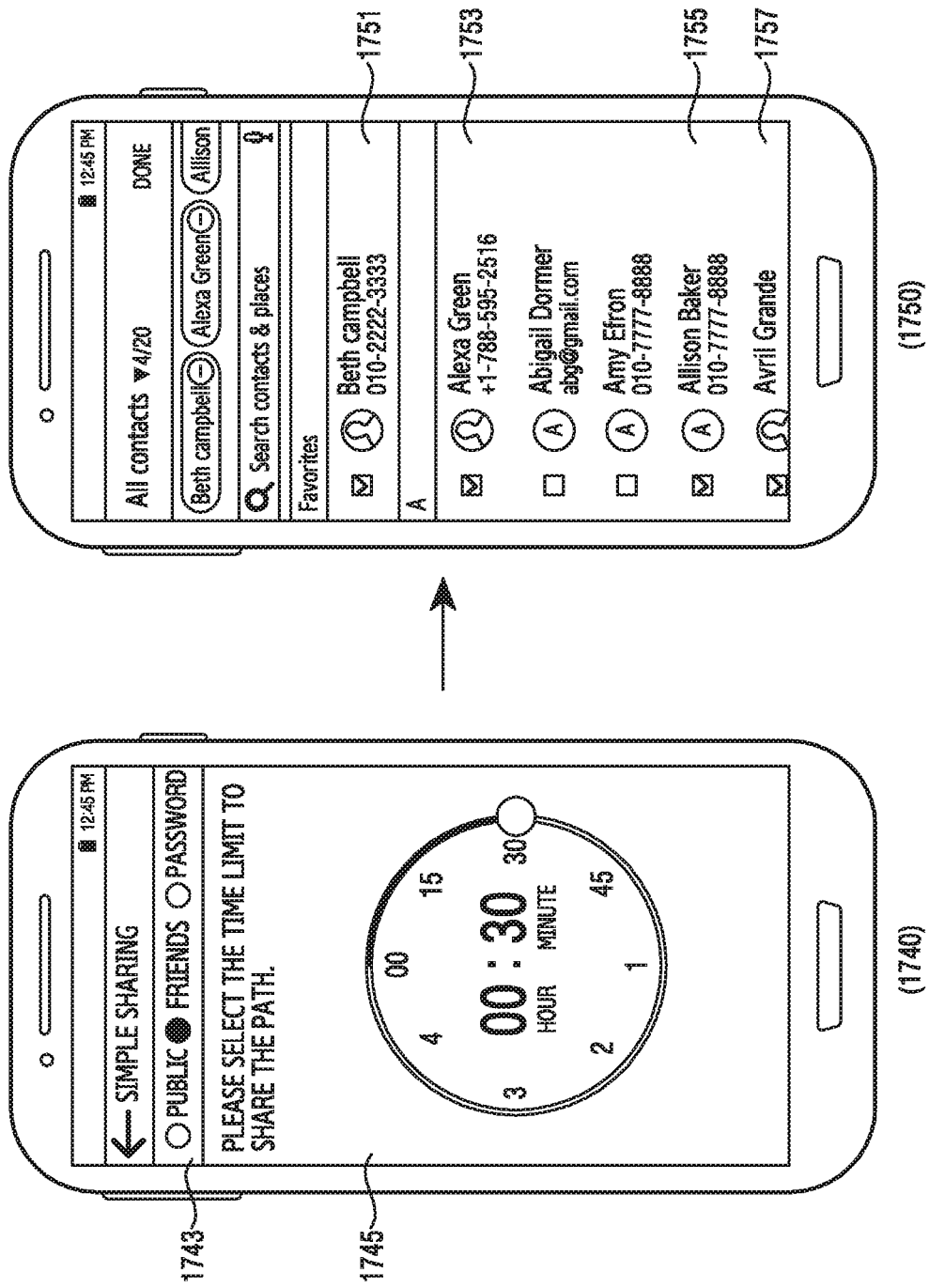
Figure 17C:
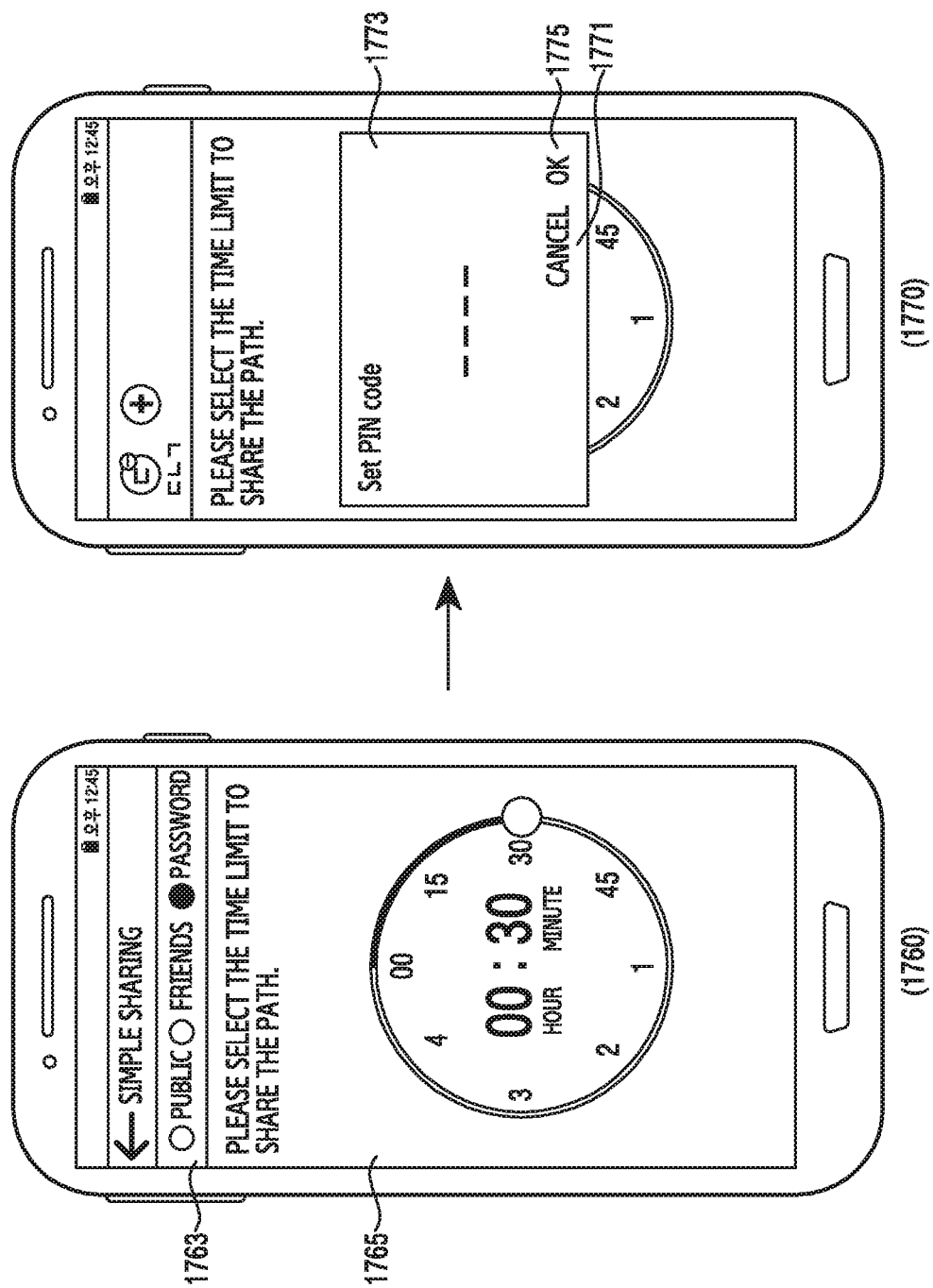

FIGS. 17A, 17B, and 17C are diagrams illustrating an example user interface for setting sharing configuration information according to various example embodiments.

FIG. 17A illustrates an example user interface which allows anyone to share (or to download) a file (or a file access path). Referring to FIG. 17A, the first electronic device 1520 can display a first user interface 1710 including a webpage to show. The first electronic device 1520 can detect a user input 1715 which selects an address in an Internet address field on the user interface 1710. The first electronic device 1520 can display a second user interface 1720 in response to the user input 1715. The second user interface 1720 can include a control menu and a keypad for editing or sharing the webpage address.

The first electronic device 1520 can detect a user input which selects a share button 1525 in the second user interface 1720. The first electronic device 1520 can display a third user interface 1730 in response to the selection of the share button 1725. The third user interface 1730 can include a sharing counterpart setting field 1733 which selects a counterpart to show the webpage, and a sharing period setting field 1735. The user can select the counterpart to show the webpage by selecting any one item of public, show to friends, and password (e.g., enter authentication code) in the sharing counterpart setting field 1733. The sharing counterpart setting field 1733 can be set to the public by default. Also, the user can select the sharing period (e.g., 30 minutes, 1 hour, 24 hours, etc.) by controlling the sharing period setting field 1735. The sharing period setting field 1735 can be set to 30-minute open by default.

FIG. 17B illustrates an example user interface which allows some users (e.g., counterparts) to share (or to download) a file (or file access path). Referring to FIG. 17B, the first electronic device 1520 can display a third user interface 1740 in response to the selection of the share button 1725. The third user interface 1740 can include the sharing counterpart setting field 1743 with the show to friends, and the sharing period setting field 1735 with 30 minutes. The first electronic device 1520 can set the sharing counterpart and the sharing period in the third user interface 1740, and then display a user interface 1750 to set the sharing counterpart. The user interface 1750 can include a counterpart list registered in the first electronic device 1520. In the user interface 1750, the user can select Beth Campbell 1751, Alexa Green 1753, Allison Baker 1755, and Avril Grande 1757 as targets to show the webpage.

FIG. 17C illustrates an example user interface which allows to share (or to download) a file (or a file access path) after entering a password. Referring to FIG. 17C, the first electronic device 1520 can display a third user interface 1760 in response to the selection of the share button 1725. The third user interface 1760 can include the sharing counterpart setting field 1743 for entering a password, and the sharing period setting field 1735 with 30 minutes. The first electronic device 1520 can set the sharing counterpart and the sharing period in the third user interface 1740, and then display a user interface 1770 for setting the password. The user interface 1770 can include a password input field 1773, a CANCEL button 1771, and an OK button 1775. The user can set the password by entering a password in the input field 1773 and then pressing the OK button 1775.

Figure 18:
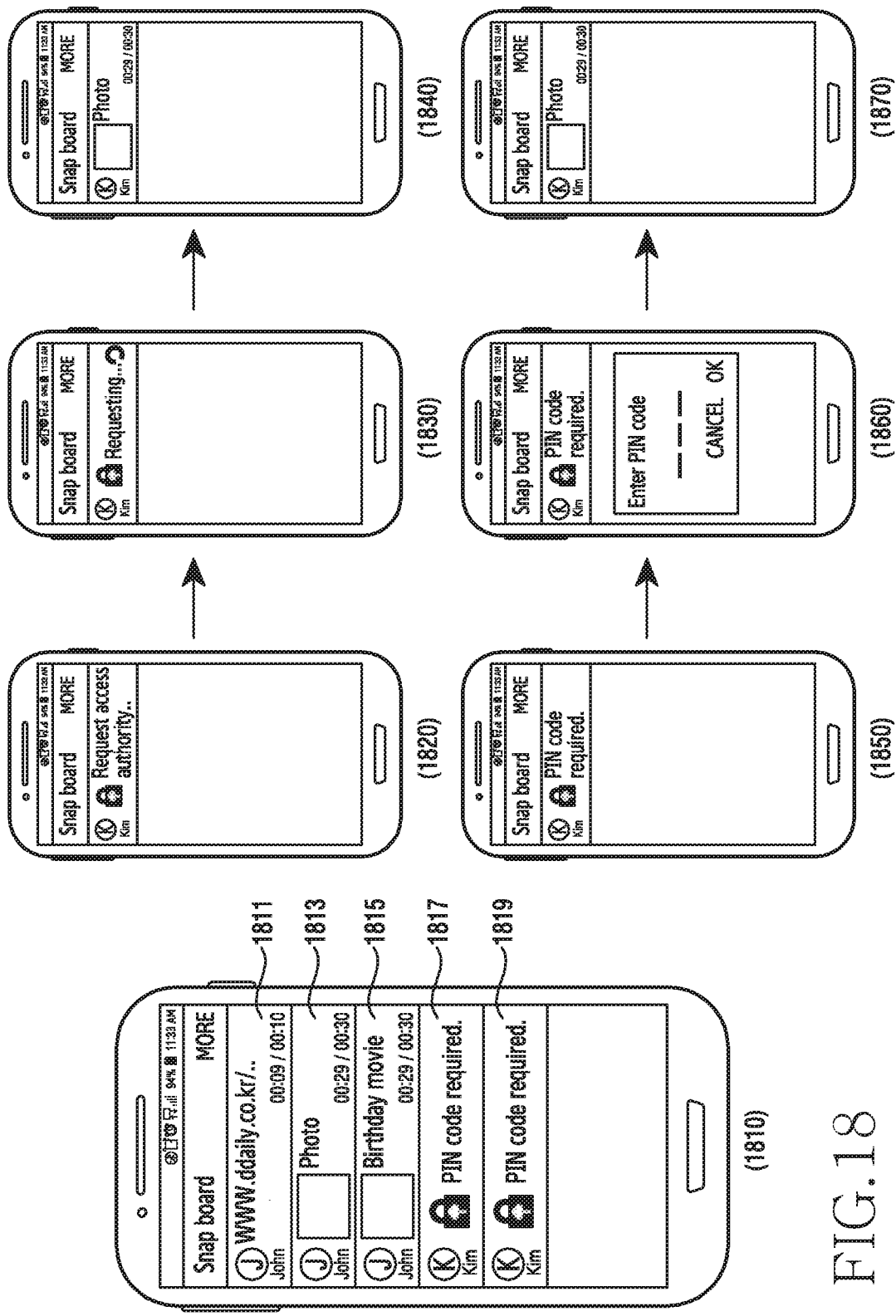
FIG. 18 is a diagram illustrating an example user interface for downloading a file through a security procedure according to various example embodiments.

FIG. 18 is a diagram illustrating an example user interface for downloading a file through a security procedure according to various example embodiments.

Referring to FIG. 18, the third electronic device 1540 can display a user interface 1810 including a file sharing list. The third electronic device 1540 can scan sharing files in the sharing area 1510 and display the user interface 1810 including the file sharing list. The user interface 1810 can include first sharing information 1811 which shares a file access path (e.g., www.ddaily.co.kr/), second sharing information 1813 which shares a image (e.g., photo), third sharing information 1815 which shares a video, and fourth sharing information 1817 and fifth sharing information 1819 which share files by entering a password.

The third electronic device 1540 can download intended sharing information in the user interface 1810. The third electronic device 1540 can download the first sharing information 1811, the second sharing information 1813, and the third sharing information 1815 without passing through an additional security procedure. The third electronic device 1520 can download the fourth sharing information 1817 and the fifth sharing information 1819 after passing through an additional security procedure.

When selecting the fourth sharing information 1817 in the user interface 1810, the third electronic device 1540 can provide a user interface 1820 which guides to authorization of a sharer (e.g., the first electronic device 1520). Next, the third electronic device 1540 can request the server 300 or the sharer to share a file. In response to the request, the third electronic device 1540 can display a user interface 1830 which requests to authorize the file sharing. When the sharer is authorized to share the file, the third electronic device 1540 can display a user interface 1840 including sharing information corresponding to the fourth sharing information 1817.

When selecting the fifth sharing information 1819 in the user interface 1810, the third electronic device 1540 can provide a user interface 1850 which guides to need a password (e.g., an authentication code). Next, the third electronic device 1540 can display a user interface 1860 for entering the authentication code. When the entered authentication code matches the authentication code of the sharing configuration information of the sharer, the third electronic device 1540 can display a user interface 1870 which includes sharing information corresponding to the fifth sharing information 1819.

Figure 19:
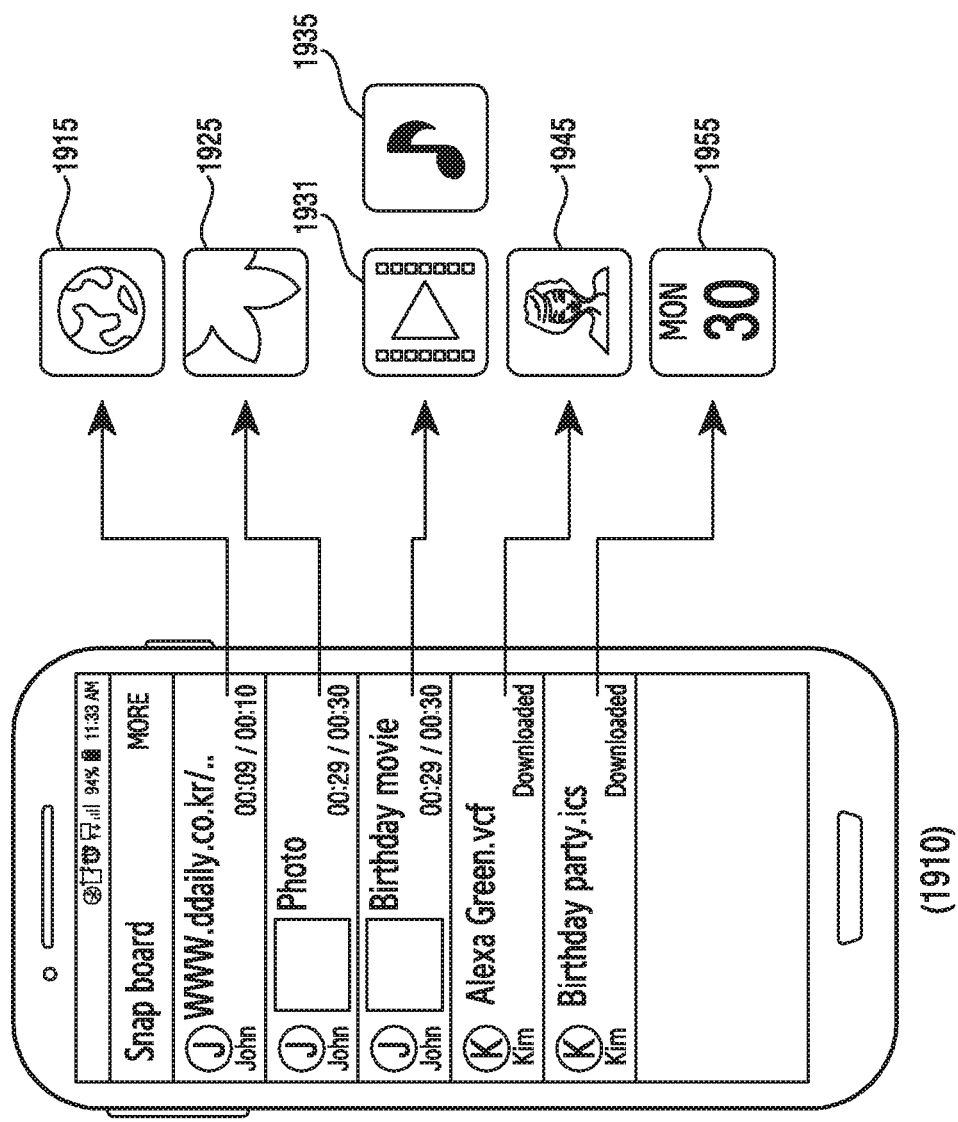
FIG. 19 is a diagram illustrating an example user interface for using a downloaded file according to various example embodiments.

FIG. 19 is a diagram illustrating an example user interface for using a downloaded file according to various example embodiments.

Referring to FIG. 19, the third electronic device 1540 can display a user interface 1910 including a file sharing list of the completed downloading. When selecting first sharing information (e.g., URL) in the user interface 1910, the third electronic device 1520 can access an Internet address (e.g., URL) corresponding to the first sharing information and display its webpage. For doing so, the third electronic device 1540 can execute an application 1915 for displaying a webpage (or for accessing to the Internet address). When selecting second sharing information (e.g., an image) in the user interface 1910, the third electronic device 1540 can display an image using an image viewer application 1925 corresponding to the second sharing information. That is, the third electronic device 1540 can execute the application (e.g., the image viewer application) for displaying the image corresponding to the second sharing information.

When selecting third sharing information (e.g., video, audio) in the user interface 1910, the third electronic device 1540 can play a video or an audio using an application 1931 or 1935 corresponding to the third sharing information. That is, the third electronic device 1540 can execute an application (e.g., the video player application 1931) for playing the video corresponding to the third sharing information. Alternatively, the third electronic device 1540 can execute an application (e.g., the audio player application 1935) for playing the audio corresponding to the third sharing information.

When selecting the fourth sharing information (e.g., contact information) in the user interface 1910, the third electronic device 1540 can execute a contact application 1945 corresponding to the fourth sharing information and display contact information using the contact application 1945. When selecting the fifth sharing information (e.g., schedule information) in the user interface 1910, the third electronic device 1540 can execute a calendar application 1955 corresponding to the fifth sharing information and display schedule information using the calendar application 1955.

A computer readable recording medium can include a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or the program module can further include at least one or more components of the aforementioned components, or can omit some of them, or can further include additional other components. Operations performed by a module, a program module, or other components of the various embodiments can be executed in a sequential, parallel, repetitive, or heuristic manner, some of the operations can be executed in a different order or may be omitted, or other operations may be added.

While the disclosure has been illustrated and described with reference to various example embodiments thereof, it will be understood by those skilled in the art that various changes in form and details may be made therein without departing from the spirit and scope of the disclosure as defined by the appended claims and their equivalents.

What is claimed is:
1. An electronic device comprising:
a memory;

a communication unit comprising communication circuitry; and a processor functionally coupled with the memory and/or the communication unit, the memory storing instructions that, when executed, are configured to cause the processor to:

identify a first user input for requesting a transmission of at least one file stored in the memory;

identify, in response to the identifying of the first user input, size of the at least one file associated with the first user input;

in response to identifying the size of the at least one file exceeds a reference size, display a user interface for receiving time information associated with the at least one file;

send the at least one file to a server through the communication unit, receive from the server a file access path relating to the sent at least one file;

identify a second user input for a sharing configuration information;

send, in response to the identifying of the second user input, the sharing configuration information to the server through the communication unit;

receive from the server a request of authorization for sharing the at least one file;

transmit to the server a permission of authorization for sharing the at least one file; and in response to identifying the size of the at least one file does not exceed the reference size, identify a second user input for a sharing configuration information;

store the sharing configuration information in the memory;

receive, from a third electronic device, a sharing request; and process the sharing request of the third electronic device based on the sharing configuration information stored in the memory;

wherein the sharing configuration information includes at least one of a sharing period, a sharing counterpart, a sharing channel and a sharing authentication code of the at least one file;

wherein, in order to process the sharing request, the instructions, when executed cause the processor to:

request, to the third electronic device, to send a sharing authentication code;

receive, from the third electronic device, a first sharing authentication code;

transmit the at least one file to the third electronic device when the first sharing authentication code matches with the sharing authentication code included in the sharing configuration information;

wherein the instructions, when executed, further cause the processor to request, to the third electronic device, to send a sharing authentication code when the third electronic device is not included in the sharing counterpart of the sharing configuration information.

2. The electronic device of claim 1, wherein, in order to identify the sharing configuration information, the instructions, when executed, cause the processor to:

display a first user interface including a webpage to show;

detect a first part of the second user input which selects an address in an internet address field on the first user interface;

display, in response to the first part of the second user input, a second user interface including a control menu and a keypad for editing or sharing the webpage address;

detect a second part of the second user input which selects a share button in the second user interface;

display a third user interface including a sharing counterpart setting field which selects the sharing counterpart and a sharing period setting field; and detect a third part of the second user input which selects the sharing counterpart and the sharing period.

3. The electronic device of claim 1, wherein, in order to process the sharing request, the instructions, when executed cause the processor to:

receive a third user input for determining whether to allow the sharing request of the third electronic device based on the sharing configuration information; and transmit the at least one file to the third electronic device in response to approving the sharing request.

4. A method performed by an electronic device comprising at least one processor, the at least one processor causing steps comprising the following to be performed:

identifying a first user input for requesting a transmission of at least one file stored in a memory of the electronic device;

identifying, in response to the identifying of the first user input, size of the at least one file associated with the first user input;

displaying, in response to identifying that the size exceeds a reference size, a user interface for receiving time information associated with the at least one file;

in response to identifying that the size of the at least one file exceeds a reference size, sending the at least one file to a server through the communication unit;

receiving a file access path relating to the transmitted at least one file from the server;

identifying a second user input for a sharing configuration information;

sending, in response to the identifying of the second user input, the sharing configuration information to the server through the communication unit;

receiving from the server a request of authorization for sharing the at least one file;

transmitting to the server a permission of authorization for sharing the at least one file; and in response to identifying that the size of the at least one file does not exceed the reference size:

identifying a second user input for a sharing configuration information;

storing the sharing configuration information in the memory;

receiving, from a third electronic device, a sharing request; and processing the sharing request of the third electronic device based on the sharing configuration information stored in the memory;

wherein the sharing configuration information includes at least one of a sharing period, a sharing counterpart, a sharing channel and a sharing authentication code of the at least one file;

wherein the processing the sharing request of the third electronic device based on the sharing configuration information stored in the memory comprises: receiving a third user input for determining whether to allow the sharing request of the third electronic device based on the sharing configuration information, and transmitting the at least one file to the third electronic device in response to approving the sharing request;

wherein the processing the sharing request of the third electronic device based on the sharing configuration information stored in the memory further comprises:

requesting, to the third electronic device, to send a sharing authentication code;

receiving, from the third electronic device, a first sharing authentication code; and transmitting the at least one file to the third electronic device when the first sharing authentication code matches with the sharing authentication code included in the sharing configuration information.

5. The method of claim 4, wherein the identifying the sharing configuration information comprises:

displaying a first user interference including a webpage to show;

detecting a first part of the second user input which selects an address in an internet address field on the first user interface;

displaying, in response to the first part of the second user input, a second user interface including a control menu and a keypad for editing or sharing the webpage address;

detecting a second part of the second user input which selects a share button in the second user interface;

displaying a third user interface including a sharing counterpart setting field which selects the sharing counterpart and a sharing period setting field; and detecting a third part of the second user input which selects the sharing counterpart and the sharing period.

6. The method of claim 5, wherein requesting, to the third electronic device, to send a sharing authentication code comprises: requesting, to the third electronic device, to send a sharing authentication code when the third electronic device is not included in the sharing counterpart of the sharing configuration information.

* * * * *